United States Patent
Nimura et al.

(10) Patent No.: US 6,651,894 B2
(45) Date of Patent: Nov. 25, 2003

(54) IMAGING METHOD, IMAGING APPARATUS, AND IMAGE INFORMATION MANAGEMENT SYSTEM

(75) Inventors: Shigeaki Nimura, Chiba (JP); Hitoshi Hattori, Kanagawa (JP); Tomohiko Beppu, Kanagawa (JP); Nobuyuki Doi, Tokyo (JP); Toshiyuki Furuta, Kanagawa (JP); Taiga Asano, Kanagawa (JP); Sadao Takahashi, Kanagawa (JP); Makoto Yamasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/006,715

(22) Filed: Dec. 10, 2001

(65) Prior Publication Data

US 2002/0070281 A1 Jun. 13, 2002

(30) Foreign Application Priority Data

Dec. 12, 2000 (JP) ........................ 2000-376922
Jun. 14, 2001 (JP) ........................ 2001-180370

(51) Int. Cl.[7] ................................. G06K 19/06
(52) U.S. Cl. ................ 235/494; 235/487; 235/462.01; 235/462.04; 235/468; 235/472.01
(58) Field of Search ................ 235/494, 487, 235/468, 462.4, 469, 462.04, 472.01, 375

(56) References Cited

U.S. PATENT DOCUMENTS

| | | | | |
|---|---|---|---|---|
| 3,933,094 A | * | 1/1976 | Murphy et al. | 283/88 |
| 4,337,375 A | * | 6/1982 | Freeman | 704/260 |
| 5,140,674 A | * | 8/1992 | Anderson et al. | 358/1.12 |
| 5,902,968 A | | 5/1999 | Sato et al. | |
| 5,981,884 A | | 11/1999 | Sato et al. | |
| 6,084,577 A | | 7/2000 | Sato et al. | |
| 6,199,765 B1 | * | 3/2001 | Uhling | 235/494 |
| 6,229,102 B1 | | 5/2001 | Sato et al. | |
| 6,270,213 B1 | * | 8/2001 | Sansone et al. | 347/100 |
| 6,330,976 B1 | * | 12/2001 | Dymetman et al. | 235/487 |
| 6,415,983 B1 | * | 7/2002 | Ulvr et al. | 235/487 |

FOREIGN PATENT DOCUMENTS

| | | |
|---|---|---|
| EP | 0 282 182 B1 | 9/1988 |
| JP | 51-135886 | 11/1976 |
| JP | 55-80477 | 6/1980 |
| JP | 56-143242 | 11/1981 |
| JP | 58-1762 | 1/1983 |
| JP | 58-13675 | 1/1983 |
| JP | 58-13676 | 1/1983 |
| JP | 60-23451 | 2/1985 |
| JP | 61-283875 | 12/1986 |
| JP | 61-296421 | 12/1986 |
| JP | 62-225577 | 10/1987 |
| JP | 63-295578 | 12/1988 |
| JP | 01006074 | 1/1989 |
| JP | 64-31881 | 2/1989 |
| JP | 1-213377 | 8/1989 |
| JP | 2-4881 | 1/1990 |
| JP | 4-174402 | 6/1992 |
| JP | 05093160 | 4/1993 |
| JP | 5-222302 | 8/1993 |
| JP | 7-141104 | 6/1995 |
| JP | 7-244657 | 9/1995 |
| JP | 8-188722 | 7/1996 |
| JP | 9-101864 | 4/1997 |
| JP | 9-263717 | 10/1997 |
| JP | 2000-26774 | 1/2000 |
| JP | 2000-215000 | 8/2000 |
| JP | 2000-293303 | 10/2000 |

* cited by examiner

*Primary Examiner*—Michael G. Lee
*Assistant Examiner*—Steven S. Paik
(74) *Attorney, Agent, or Firm*—Oblon, Spivak, McClelland, Maier & Neustadt, P.C.

(57) ABSTRACT

An imaging method includes the steps of (a) determining whether an object on which an image is to be formed is an information display medium on which a code is formed with an imaging material formed of a near infrared absorbing pigment, and (b) forming the image on the object by a printer engine with an imaging material formed of a pigment absorbing no or little light in a near infrared spectral region if the step (a) determines that the object is the information display medium.

28 Claims, 16 Drawing Sheets

$3.5MgO \cdot 0.5MgF_2 \cdot GeO_2:Mn$ $Y_2O_2S : Eu$ $Y_2O_3S : Eu$

IMAGING METHOD, IMAGING APPARATUS, AND IMAGE INFORMATION MANAGEMENT SYSTEM

BACKGROUND OF THE INVENTION

1. Field of the Invention

The present invention relates to a method and apparatus for imaging visible information on a medium on which an invisible or visible code is formed or to be formed and to an image information management system including such an apparatus.

2. Description of the Related Art

Generally, a digitized document, which is displayed on a display, is accompanied by a problem in not only readability but also portability. Therefore, the digitized document is often printed out to be read or to be carried around for use. On the other hand, such a printed document is often corrected. However, since the original digitized document and corrections are not at all linked, it is required to digitally reedit the original document later on. Hence, it is desired that a system automatically reflecting a correction of a printed document on its original digitized document, that is, a paper-based tablet system, be realized. For such a system, first, it is necessary to obtain the coordinates of the tip part of an input device on a sheet of paper.

Japanese Laid-Open Patent Application No. 9-101864 discloses an apparatus composed of a plurality of information display media, a plurality of information storage media, and an information recording apparatus. The entire part of each information display medium is like a sheet of paper, and each information display medium correctably displays and retains a variety of information. According to this system, information input to the information recording apparatus by handwriting is displayed on the information display media or stored in the information storage media, and information read out from the information storage media by the information recording apparatus is also displayed on the information display media. The information display media not only retains but also freely corrects or deletes the displayed information. Accordingly, a document can be made or stored without consuming paper.

Japanese Laid-Open Patent Application No. 61-296421 discloses an apparatus that includes a coordinate panel on which optically readable code symbols are arranged in a matrix so as to obtain coordinate information by reading the code symbols. Japanese Laid-Open Patent Application No. 7-141104 discloses an apparatus of the same technical contents.

Japanese Laid-Open Patent Application No. 7-244657 discloses an apparatus that edits a document by reading barcodes of file information such as file names printed on sheets of paper when correction is made on the paper sheets.

Further, Japanese Laid-Open Patent Application No. 2000-215000 discloses an information processing system where an invisible code having characteristic position information is preprinted on each information display medium on which reversible recording is performable, and correction information is recognized by the invisible information. The invisible code is used for information security purposes.

Furthermore, according to a coordinate input apparatus, an information processing system, and a medium disclosed in Japanese Laid-Open Patent Application No. 2000-293303, optically readable code symbols are arranged in a matrix on a sheet of paper, and the code symbols are read by a micro-camera provided to a pen as corrections are made on the paper sheet by the pen so that coordinate information can be obtained simultaneously with correction information. Thereby, the correction information, which is read in real time, is correlated to the information of the paper sheet before correction.

As means for retaining a variety of information such as characters and images in a visible state, Japanese Laid-Open Patent Application No. 9-101864 proposes the technique that is a combination of the merits of traditional means of recording information on a paper sheet and means of recording information on a computer including a display and a memory, where the advantages and disadvantages of both means are considered. In other words, Japanese Laid-Open Patent Application No. 9-101864 discloses the apparatus that can rewrite information input by handwriting or created by a computer to be recorded on a recording medium many times (that is, the recording medium is not consumed like paper sheets) so as to be able to process the information as computer-processible digital information that can be stored in memory and output to or input from outside.

However, from a usability point of view, this apparatus, which requires a plurality of information display media having information written thereto or printed thereon to be placed on the tablet so that corrections are made on the media, is inconvenient since the apparatus needs the tablet to be carried around with the information display media when necessary.

Further, for personal use of individuals, as much convenience and functionality as those in the case of writing information on traditional paper sheets by using writing instruments should be achieved. However, users may feel differently in writing work using the tablet from the way they feel in writing information on the paper sheets using the writing instruments, thus having uncomfortable feeling.

These disadvantages are common to the techniques disclosed in Japanese Laid-Open Patent Applications No. 61-296421 and No. 7-141104.

According to the technique disclosed in Japanese Laid-Open Patent Application No. 7-244657, when corrections are made on the tablet, a document is edited by reading the barcode on each paper sheet. However, this requires troublesome work of reading the barcode of each paper sheet in editing the document.

On the other hand, according to the system disclosed in Japanese Laid-Open Patent Application No. 2000-293303, when a printed document is corrected, corrections are automatically reflected on its original digitized document. However, this type of system requires correlating the original digitized document with the recording medium of the printed document, and it is desirable that the correlation be made as automatically as possible with the least human intervention possible.

Further, in the case of Japanese Laid-Open Patent Application No. 2000-215000, an information display medium is limited to the one on which reversible recording is performable, and there is no description of how visible information is printed on the information display medium.

Generally, the invisible code is printed with ink using an ultraviolet (UV) luminescent material, a near infrared luminescent material, or a near infrared absorbing material. The invisible code is recognized as an image by image acquisition means such as a charge-coupled device (CCD) detecting light in the UV spectral region or the near infrared spectral region. However, if corrections are made or an image is formed on a medium printed with such an invisible code with any of materials that absorb light in the above-described spectral regions, it is extremely difficult or impossible to recognize the invisible code. This is the case not only with the invisible code but also with a visible code printed in a visible but visually quiet color, such as a light gray. Some near infrared absorbing pigments are of visible colors such as the light gray.

SUMMARY OF THE INVENTION

It is a general object of the present invention to provide an imaging method, an imaging apparatus, and an image information management system in which the above-described disadvantages are eliminated.

A more specific object of the present invention is to provide an imaging method and apparatus that prevent formation of a visible image on an information display medium on which an invisible or visible code is formed with an imaging material using a near infrared absorbing pigment from affecting recognition of the invisible or visible code.

Another more specific object of the present invention is to provide an imaging method and apparatus that are employed in a system where a user, in printing a desired document, prints an invisible or visible code and the document successively on a paper medium (a plain paper sheet) with no preprinted code, and information written to the printout of the document with a pen is obtained as digital information and electrically (digitally) added to the original document based on code information.

Yet another more specific object of the present invention is to provide an image information management system that enables temporary use of codes so that the codes, which are limited, can be effectively used.

The above objects of the present invention are achieved by an imaging method including the steps of (a) determining whether an object on which an image is to be formed is an information display medium on which a code is formed with an imaging material formed of a near infrared absorbing pigment, and (b) forming the image on the object by a printer engine with an imaging material formed of a pigment absorbing no or little light in a near infrared spectral region if the step (a) determines that the object is the information display medium.

According to the above-described imaging method, since the imaging material using the pigment absorbing no or little light in the near infrared spectral region is used in forming the visible image on the information display medium having the code formed thereon, the formation of the image over the code does not affect recognition of the code. Therefore, the code can be recognized correctly. As a result, the visible image can be formed on the information display medium having the code formed thereon without any problem.

The above objects of the present invention are also achieved by an imaging apparatus including a printer engine, a determination part that determines whether an object on which an image is to be formed is an information display medium on which a code is formed with an imaging material formed of a near infrared absorbing pigment, and an imaging part that forms the image on the object by the printer engine with an imaging material formed of a pigment absorbing no or little light in a near infrared spectral region if the determination part determines that the object is the information display medium.

According to the above-described imaging apparatus, since the imaging material using the pigment absorbing no or little light in the near infrared spectral region is used in forming the visible image on the information display medium having the code formed thereon, the formation of the image over the code does not affect recognition of the code. Therefore, the code can be recognized correctly. As a result, the visible image can be formed on the information display medium having the code formed thereon without any problem.

The above objects of the present invention are also achieved by an imaging method including the steps of (a) forming a code on a paper medium with an imaging material formed of a near infrared absorbing pigment, and (b) forming an image on the paper medium with an imaging material using a pigment absorbing no or little light in a near infrared spectral region.

According to the above-described imaging method, at any time, a user can obtain the trace of handwriting on an existing document printed on a paper medium such as a plain paper sheet. That is, the above-described imaging method is applicable to the system where a user, in printing a desired document, prints an invisible or visible code and the document successively on a paper medium (a plain paper sheet) with no preprinted code, and information written to the printout of the document with a pen is obtained as digital information and electrically (digitally) added to the original document based on code information.

The above objects of the present invention are also achieved by an imaging apparatus including a code formation part that forms a code on a paper medium with an imaging material formed of a near infrared absorbing pigment, and an imaging part that forms an image on the paper medium with an imaging material using a pigment absorbing no or little light in a near infrared spectral region.

According to the above-described imaging apparatus, at any time, a user can obtain the trace of handwriting on an existing document printed on a paper medium such as a plain paper sheet. That is, the above-described imaging method is applicable to the system where a user, in printing a desired document, prints an invisible or visible code and the document successively on a paper medium (a plain paper sheet) with no preprinted code, and information written to the printout of the document with a pen is obtained as digital information and electrically (digitally) added to the original document based on code information.

The above objects of the present invention are further achieved by an image information management system including an imaging apparatus and an information input apparatus, wherein the imaging apparatus includes a code formation part that forms a code symbol on a paper medium with an imaging material formed of a near infrared absorbing pigment and an imaging part that forms an image on the paper medium with an imaging material using a pigment absorbing no or little light in a near infrared spectral region, and the information input apparatus includes an image reading device that optically reads the code symbol formed on the paper medium, a decoding part that decodes the read code symbol, a distortion calculation part that calculates at least one of a position, orientation, and distortion of the code symbol in an image read by the image reading device, and a coordinate detection part that detects a position of a certain point on the paper medium.

Additionally, in the image information management system, the coordinate detection part of the information input device may detect the position of the certain point on the paper medium based on at least one of coordinate information representing coordinates on the paper medium and identification information that identifies the paper medium and on at least the one of the position, the orientation, and the distortion of the code symbol, the coordinate and identification information being included in information of the decoded code symbol.

Additionally, in the image information management system, the code symbol formed by the code formation part of the imaging apparatus may be temporary non-characteristic coordinate information, the code symbol being managed by an information processing apparatus while the information input apparatus obtains a trace of handwriting and freed after an operation of adding the trace of the handwriting to an image source is completed.

Thereby, the image information management system that enables temporary use of codes so that the codes, which are limited, can be effectively used can be provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of embodiments of the present invention.

First, a description will be given, with reference to FIGS. 1 through 3, of a first embodiment of the present invention. In this embodiment, a visible image is formed on an information display medium on which an invisible code is formed as a code by using a color imaging apparatus by electrophotography, such as a laser color printer.

In the present invention, the term "code" refers to an invisible or visible code formed by using an imaging material formed of a near infrared absorbing pigment, in which code information such as coordinate information and information for recognizing an information display medium printed with the code is embedded by the system of a two-dimensional code (a QR code, for instance) or a characteristic code. Generally, the code is recognizable by capturing its image by an image acquisition element such as a CCD or a complementary MOS (CMOS). The "near infrared absorbing pigment" refers to a pigment that absorbs light in a spectral region of approximately 700 to 1500 nm. For instance, the "near infrared absorbing pigment" includes carbon black, a cyanine-based pigment, an immonium-based pigment, a diimmonium-based pigment, a triarylmethane-based pigment, a naphthoquinone-based pigment, an anthraquinone-based pigment, a squarylium-based pigment, a phthalocyanine-based pigment, a naphthalocyanine-based pigment, and a nickel-dithiol complex-based pigment (see Japanese Laid-Open Patent Application Nos. 51-135886, 56-143242, 58-1762, 58-13676, 60-23451, 63-295578, 4-174402, 5-93160, and 5-222302, and Japanese Examined Patent Application Publication No. 2-4881). The near infrared absorbing pigment is not limited to any of the above-described pigments, but may be any material that absorbs light in the near infrared spectral region. The "information display medium" means a sheet medium made of paper, cloth, or plastic.

Here, a brief description will be given, with reference to FIG. 1, of an information display medium 1 according to the present invention. The information display medium 1, which is such a medium as described in the above-described Japanese Laid-Open Patent Application No. 2000-215000, for instance, has an invisible code formed thereon as a code. A document can be recorded on the information display medium 1 so that human beings can visually read the document. The information display medium 1 is prerecorded with code symbols 2 that can be read optically by a CCD. The code symbols 2, for instance, are expressed by barcodes or two-dimensional codes such as QR codes.

The information display medium 1 has an object of visibly recording and displaying information through an imaging operation by a printer or a copier, for instance. Therefore, as will be later describe, the information display medium 1 is formed so that a visible image can be formed thereon by the imaging operation by the printer.

Figure 1:
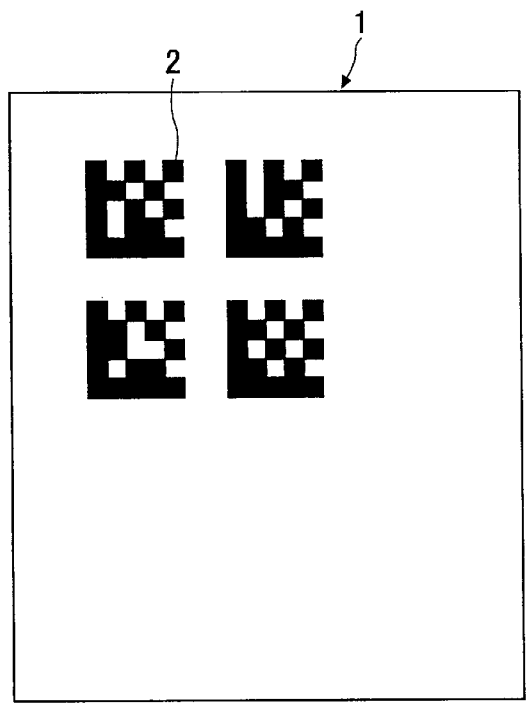
FIG. 1 is a plan view of an information display medium employed in the present invention, showing a configuration thereof in an exaggerated manner.

Although the only four code symbols 2 are shown in the upper left corner of the information display medium 1 in FIG. 1, the numerous code symbols 2 are actually arranged in a matrix on the information display medium 1. In FIG. 1, the code symbols 2 are shown extremely exaggerated in size with respect to the information display medium 1 for convenience of description. Actually, the code symbols 2 are fine in size.

The code symbols 2 include coordinate information and identity information. In order to secure the security of the identity information, the code symbols 2 are recorded as the invisible code with an imaging material formed of a near infrared absorbing pigment.

The color imaging apparatus of this embodiment, whose configuration will be later described, is provided with a code recognition apparatus (not shown in the drawings) recognizing the information display medium 1 having the invisible code formed thereon. The code recognition apparatus is originally used for recognizing an image by reading the invisible code formed on the information display medium 1. For instance, the code recognition apparatus is composed of an image acquisition element for reading the invisible code, such as a CCD and a CMOS, and an infrared illumination light source such as a light-emitting diode (LED) or an incandescent lamp. When a sheet medium is set on the conveyer of the code recognition apparatus, the code recognition apparatus automatically reads the invisible code of the sheet medium. Alternatively, the owner of the information display medium 1, prior to an imaging operation, may establish a setting corresponding to the information display medium 1 having the invisible code formed thereon by operating a changeover switch provided on an operation panel instead of using such a code recognition apparatus.

Under this premise, a description will be given, with reference to FIG. 2, of an imaging method according to this embodiment. FIG. 2 is a flowchart of the outline of a control operation performed by the microcomputer of a control part 10 of the color imaging apparatus shown in FIG. 3.

First, in step S1, a start button of the color imaging apparatus is pressed down. Then, in step S2, it is determined whether an object on which imaging is performed (an object medium) is the information display medium 1 on which the invisible code is formed with the imaging material formed of the near infrared absorbing pigment. Here, if the color imaging apparatus includes the code recognition apparatus, this determination is made based on a result of recognition by the code recognition apparatus. If the color imaging apparatus is not provided with the code recognition apparatus and a user sets a type of the object medium, this determination is made based on the contents of the setting by the user. Anyway, the operation of step S2 is performed as a determination process (step) or the function of a determination part.

If it is determined in step S2 that the object medium is not the information display medium 1 having the invisible code formed thereon (that is, NO in step S2), in step S3, imaging is performed on the object medium according to normal electrophotography, and when the imaging is completed, in step S4, the imaging operation is stopped.

Figure 3:
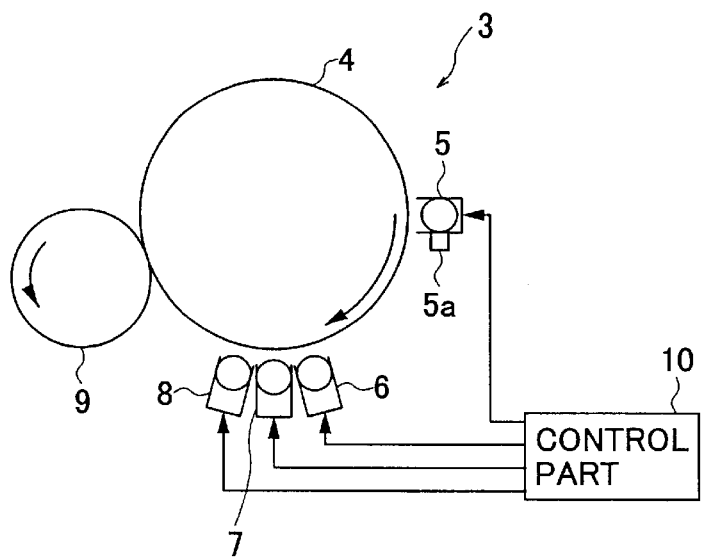
FIG. 3 is a schematic diagram showing a configuration of a printer engine part of an electrophotographic color printer.

On the other hand, if it is determined in step S2 that the object medium is the information display medium 1 on which the invisible code is formed (that is, YES in step S2), in step S5, imaging is performed on the information display medium 1 by a printer engine 3 of the color imaging apparatus shown in FIG. 3 with imaging materials using pigments that absorb no or little light in the near infrared spectral region. Specifically, only color imaging materials of yellow, magenta, and cyan provided in a normal color printer are used, while a black toner formed of carbon black is not used in this operation. The operation of step S5 is performed as the imaging process (step) or the function of the imaging part. The operation of step S5 is performed in the case of forming not only a color image but also a black image on the information display medium 1. In the case of forming the black image, the black image is formed with a combination of the color imaging materials of yellow, magenta, and cyan without using the black toner.

Therefore, according to the imaging method for forming or printing an image on the object medium, if the object medium is the information display medium 1 having the invisible code formed thereon, a visible image is formed by only using pigments that absorb no or little light in the near infrared spectral region, such as the imaging materials of yellow, magenta, and cyan. Therefore, even if the visible image is formed on the invisible code, no problem is caused in recognizing the invisible code. Particularly, in the case of forming the black image, no problem is caused in recognizing the invisible code either since the black image is formed with the combination of the imaging materials of yellow, magenta, and cyan without using the common black toner formed of carbon black which toner is highly absorptive with respect to light in the near infrared spectral region. In terms of process, the black image is also formed with a combination of the processes of the colors as in color image formation.

FIG. 3 is a schematic diagram showing a configuration of the printer engine 3 of the color imaging apparatus of this embodiment which apparatus realizes the above-described imaging method.

As shown in FIG. 3, a black color developing device 5 provided with a black color developing device monitor 5a, color developing devices 6 through 8 for cyan, magenta, and yellow, respectively, and a transfer drum 9 are provided around a light-sensitive body 4 in a rotational direction thereof. An electrostatic latent image is formed on the light-sensitive body 4. The color developing devices 6 through 8 may be provided in any order.

Further, although not shown in the drawing, an electrification charger that uniformly charges the light-sensitive layer of the light-sensitive body 4, a transfer charger that transfers a toner image on the light-sensitive body 4 onto a transfer paper (including the information display medium 1), a separation charger that separates the transfer paper finished with the image transfer from the surface of the transfer drum 9, a cleaning device that removes a residual toner on the surface of the light-sensitive body 4, a discharger that removes the electric charge on the surface of the light-sensitive body 4, and a conveying part that conveys the transfer paper are provided around the light-sensitive body 4. Furthermore, a fixing device is provided to fix the toner image on the transfer paper finished with the image transfer by heat and pressure. In addition, the control part 10 is provided to control the power supply part of the chargers and motors that drive the rotating bodies including the light-sensitive body 4.

According to the configuration shown in FIG. 3, an exposure position on the precharged light-sensitive body 4 is exposed to light so that the electrostatic latent image is formed on the light-sensitive body 4. If the contents of the electrostatic latent image is black, normally, toner development is performed by the black color development device 5, and the transfer paper reaches the light-sensitive body 4 at the same time that the leading part of the visible image reaches the transfer drum 9 so that the visible image (the black toner image) is transferred onto the transfer paper. Thereafter, the transfer paper is separated from the transfer drum 9 to be conveyed to the fixing device. However, a black toner is usually formed of carbon black, and is highly absorptive with respect to light in the near infrared spectral region. Therefore, in this embodiment, if the invisible code is recognized by the above-described determination part in step S2, the black image is formed like a color image by using the combination of the below-described three colors of cyan, magenta, and yellow instead of using such a normal process of forming a black image.

That is, in color imaging, an image is separated into the three colors, and a process of latent image formation, development, and transfer is performed with respect to each color. After this process is repeated three times, the image is conveyed to the fixing device. Specifically, first, a latent image is formed on the light-sensitive body 4 with respect to a first color (for instance, cyan). The latent image is developed by the color developing device 6 as a cyan image, and the cyan image is transferred onto the transfer paper that is delivered in exact timing with the cyan image. Thereafter, the transfer paper finished with the transfer of the first color is wrapped around the transfer drum 9 in preparation for the transfer of a second color. After the transfer of the first color is completed, a latent image for the second color (for instance, magenta) is formed on the light-sensitive body 4, and a magenta image is developed by the color developing device 7. The transfer drum 9 is rotated so that the magenta image reaches a transfer position at the right timing, and the magenta image is transferred onto the transfer paper over the cyan image. When the transfer of the second color is completed, a latent image for a third color (for instance, yellow) is formed on the light-sensitive body 4, and a yellow image is developed by the color developing device 8. The transfer drum 9 is rotated so that the yellow image reaches the transfer position at the right timing, and the positioned yellow image is superposed on the composite image of the above-described two images. Thereby, a black and color image is formed. After the transfer of the third color is completed, the transfer paper is separated from the transfer drum 9 to be delivered to the fixing device.

Accordingly, the desired object of the present invention is achieved without making a great change in the current laser color printer.

Figure 4:
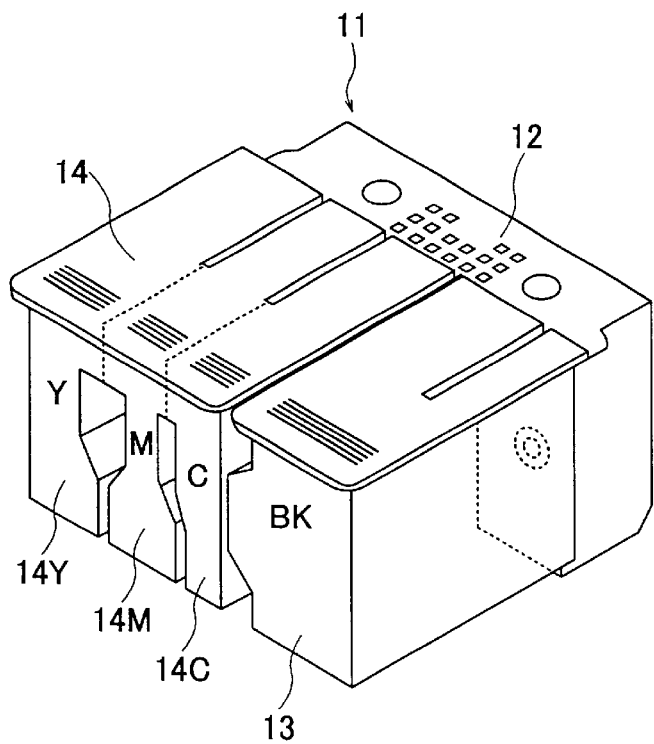
FIG. 4 is a perspective view of a ink jet printer engine part according to a second embodiment of the present invention.
Figure 5:
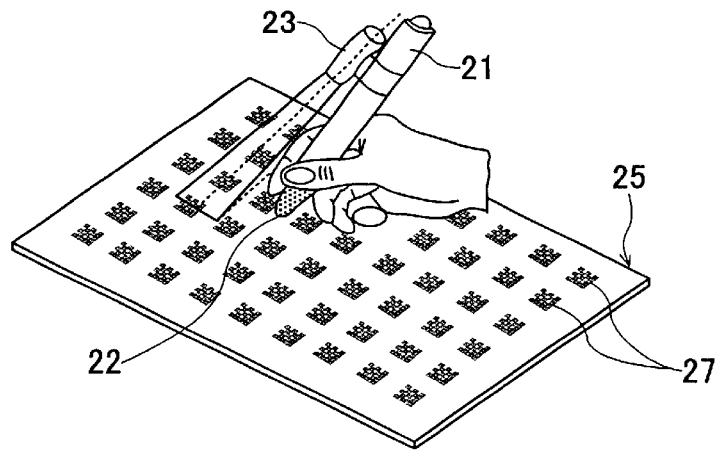
FIG. 5 is a diagram showing a configuration of a fourth embodiment of the present invention.

A description will be given, with reference to FIG. 4, of a second embodiment of the present invention. This embodiment shows an application of the present invention to a color imaging apparatus including an ink jet printer engine. As shown in FIG. 4, an ink jet head 12, a black ink tank 13 of a cartridge type, and a color ink tank 14 are integrally formed into a printer engine 11 of this embodiment so that an image is directly formed on an object on which imaging is performed (an object medium). The color ink tank 14 is composed of tanks of three color materials that are a cyan ink tank 14C, a magenta ink tank 14M, and a yellow ink tank 14Y. These ink tanks 14C, 14M, and 14Y may be separated from the ink jet head 12 or be separated from one another. Some of black colors provided in the current ink jet printers absorb no light in the near infrared spectral region. Overall, however, black colors that are formed of carbon black to increase durability of printed images and, therefore, absorb light in the near infrared spectral region are on the increase.

In the case of printing by the ink jet printer, unlike electrophotography, an image is formed by directly ejecting ink on the object medium (a printing medium) (including the information display medium 1) by the ink jet head 12.

Figure 2:
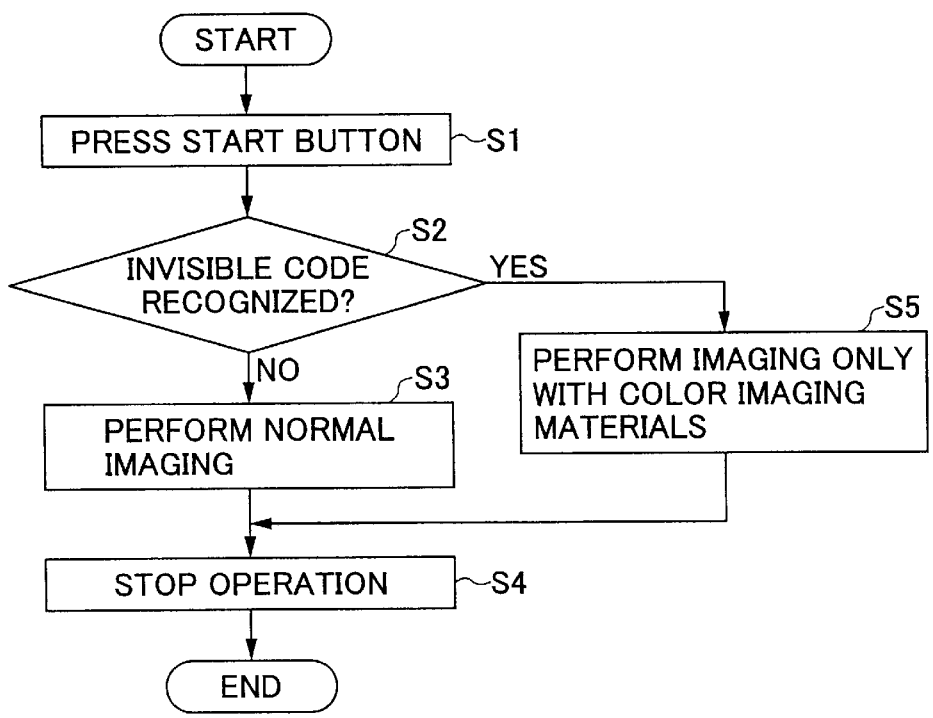
FIG. 2 is a flowchart of an outline of a control process of an imaging method according to a first embodiment of the present invention.

The process control shown in FIG. 2 is also applied to the ink jet printer of this embodiment. When the object medium is recognized as the information display medium 1 having the invisible code formed thereon, even a black image is formed with a combination of inks of the three colors of cyan, magenta, and yellow in the cyan ink tank 14C, the magenta ink tank 14M, and the yellow ink tank 14Y without using the black ink tank 13.

Accordingly, the desired object of the present invention is also achievable without making great change in the current ink jet color printer.

A description will now be given of a third embodiment of the present invention. The present invention relates to an imaging material employed in forming a black image on the information display medium 1 having the invisible code formed thereon. In this embodiment, a black imaging material formed of pigments of the three colors of cyan, magenta, and yellow is prepared instead of a black toner or a black ink to be used for forming the black image.

According to this method, the monochrome black imaging material prepared for a black color is employed from the beginning. Therefore, compared with the case of forming the black image in accordance with a color process, time required for forming the black image is reduced since only a monochrome process (a normal process for black image formation) is required to form the black image. Further, the formed image becomes clear with no color shift because the monochrome process does not depend on superposition of colors. Furthermore, this method is economical since the imaging materials can be reduced in amount.

Although the electrophotographic and ink jet printers are used as examples in the descriptions of these first through third embodiments, the present invention is applicable to a printer of any type in its implementation.

Further, in the first through third embodiments, the descriptions are given of the cases where the invisible code is formed as a code. However, the code is not necessarily the invisible code, but may be the visible code. That is, some near infrared absorbing pigments are of visible but visually quiet colors such as visible light colors of visually quiet levels. An organic infrared absorbing material is an example of an imaging material using a near infrared absorbing pigment and used in forming a visually quiet (visible) code on a paper medium. It is impossible to form a perfectly invisible, that is, transparent, code with such a type of material. In the case of using a cyanine-based pigment or a naphthoquinone-based pigment that absorb light in a visible region, the code presents a reddish cream color. The coordinates of an information display medium having such a code formed thereon can also be detected by using, for instance, the pen-type input device disclosed in the above-described Japanese Laid-Open Patent Application No. 2000-293303. With the invisible code, the user can perform writing more comfortably on the information display medium 1.

A description will be given, with reference to FIGS. 5 through 12, of a fourth embodiment of the present invention. In this embodiment, unlike the above-described embodiments in which document information is printed on a medium (the information display medium 1) on which the visible or invisible code (the code symbols 2) is (are) preprinted by offset printing, a code or code symbols and document (image) information are successively printed at the time of printing only if the user desires to add information written with a pen-type information input device by using the code symbols to the original document as digital information.

Figure 6:
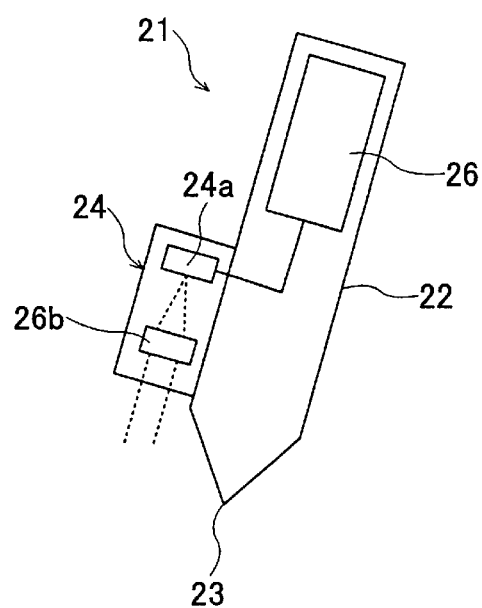
FIG. 6 is a side view of a pen-type information input device according to the fourth embodiment.

First, a brief description will be given, with reference to FIG. 6, of a pen-type information input device 21 used in this embodiment. The pen-type information input device 21 is the same as that disclosed in the above-described Japanese Laid-open Patent Application No. 2000-293303. As a basic configuration, the pen-type information input device 21 includes a device main body 22 shaped like a writing instrument so that the user can hold the device main body 22 in hand to perform writing. If necessary, the tip part of a writing instrument such as a ballpoint pen or a mechanical pencil may be attached to a tip part 23 of the device main body 22 so that the pen-type information input device 21 can be used as an actual writing instrument. An image reading device 24 attached to a side of the device main body 22 is composed, for instance, of a photoelectric conversion element 24a such as an area-type CCD and an optical system 24b including a lens, and reads an image on a paper medium 25 shown in FIG. 5. A illumination system using an infrared LED is provided in the image reading device 24.

A microcomputer 26 is mounted in the device main body 22 to be connected to the image reading device 24. The microcomputer 26 performs a variety of operations based on the image on the paper medium 25 read by the image reading device 24. That is, the microcomputer 26 decodes read code symbols 27, and detects the position, orientation, and distortion of each code symbol 27 on the read image. Thereby, a decoding part and a distortion calculation part are realized. Further, the microcomputer 26 is connectable to an external information processing apparatus (not shown in the drawing) outside the device main body 22, such as a personal computer (PC) via communication means so that data stored in the microcomputer 26 can be output to the information processing apparatus. Instead of mounting the microcomputer 26 in the device main body 22, it is also practicable to connect the image reading device 24 to the information processing apparatus so that the information processing apparatus can perform the above-described operations performed by the microcomputer 26.

Further, it is desirable that the device main body 22 be provided with a device that detects the presence or absence of a contact of a part of the tip part 23 with the writing surface of the paper medium 25. That is, the part of the tip part 23 is made movable in a direction along a penholder or the length of the device main body 22, and is moved when the tip part 23 contacts the writing surface so that the motion is detected as a mechanical change or a change in conductivity. This technique is well-known as a technique already applied to the pen of a tablet.

With respect to the detection and processing of the written information, handwriting detection (absolute coordinate detection) is performed by detecting the code symbols 27 embedded into the paper medium 25. In other words, handwriting data detected by the image reading device 24 and the decoding part is processed by the microcomputer 26 to be finally stored in a memory.

Here, the two-dimensional code is employed as the code symbols 27 representing identification information and coordinate information. The code symbols 27 each containing the coded identification and coordinate information are arranged two-dimensionally. Document data (document, catalog, etc.) stored in a server or the PC is printed on the paper medium by a printer or a printing machine (not shown in the drawing). The identification information (identification symbols) represents, for instance, a document name, a page number, a server name, and a server IP address, and determines a characteristic place where the document data is stored (by the page, minimally) in accordance with a directory structure such as "¥¥server name (server IP address) ¥¥drive name¥¥folder name¥¥document name¥¥page". If such information is not encodable, numeric information is encoded first and a table of correspondence between the identification information and the numeric information is prepared and managed on the side of the server or PC so that the table may be programmed to be referred to later on. Here, employed is the two-dimensional code whose data capacity can be enlarged, such as the QR code or a data matrix code that can encode the identification information together with the coordinate information. In this case, a large data capacity can be secured. Therefore, the identification and coordinate information can be input by the single code.

Here, the "identification information" represents the identification of a paper medium by a number unique thereto in the world, for instance.

A description will be given of the coordinate information. In the above-described first through third embodiments, numberless absolute coordinate values are prepared as characteristic values, and the characteristic coordinate values are used as the coordinate information. These coordinate values are preprinted on a paper medium as a code by offset printing, and the paper medium is manufactured as a paper medium with code. Then, at the time of document printing by the user, the imaging apparatus detects the presence or absence of the code, and correlates the code with a document to be printed by an information processing apparatus such as a computer.

On the other hand, in this embodiment, numberless absolute coordinate values are prepared as characteristic values, and the characteristic coordinate values are used as the coordinate information. Any coordinate value that is once used is never reused. That is, the coordinate values are disposable This embodiment is different from the above-described embodiments in that these characteristic absolute coordinate values are not preprinted on the paper medium 25, but are assigned as electronic data in the server or PC. That is, the code is formed at the time of printing an object document only if the user desires to digitize writing by using the pen-type information input device 21.

In a later-described fifth embodiment, non-characteristic coordinate values, that is, temporary values, are employed as the coordinate information. Accordingly, the coordinate values are not necessarily required to be assigned by the PC as described above, but may be created by the user on her/his own. The coordinate values may be reused on condition that the coordinate values are managed so as not to be used by one user while used by another user. With respect to these non-characteristic coordinate values, the code is also formed at the time of printing an object document only if the user desires to digitize writing by using the pen-type information input device 21.

In the above-described case, the image reading device 24 of the pen-type information input device 21 is required to detect the code symbols 27 and the document (image) separately from each other with an infrared light, which does not offend human eyes, being projected as a illumination system. Further, printing is performed by a printer (an imaging apparatus) 30 shown in FIG. 7 with an imaging material using a pigment absorbing light in the near infrared spectral region being employed as a material of the code symbols 27 printed on the paper medium 25 and an imaging material using a pigment absorbing no or little light in the near infrared spectral region being employed as a material of the image information including the document.

Figure 7:
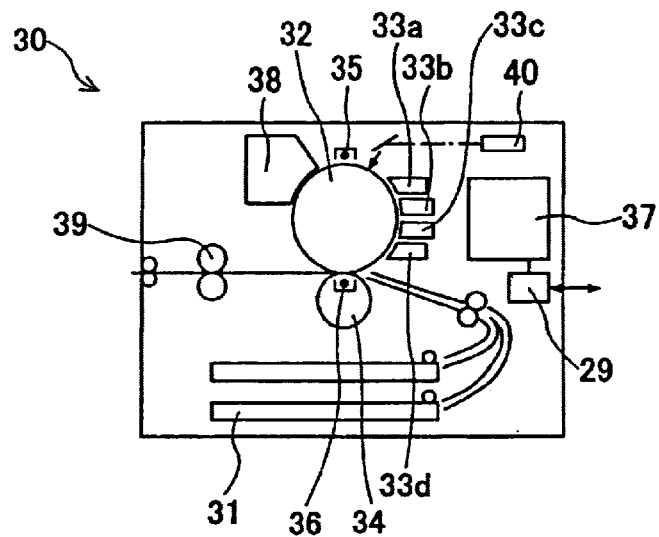
FIG. 7 is a schematic diagram showing a configuration of a printer according to the fourth embodiment.
Figure 8:
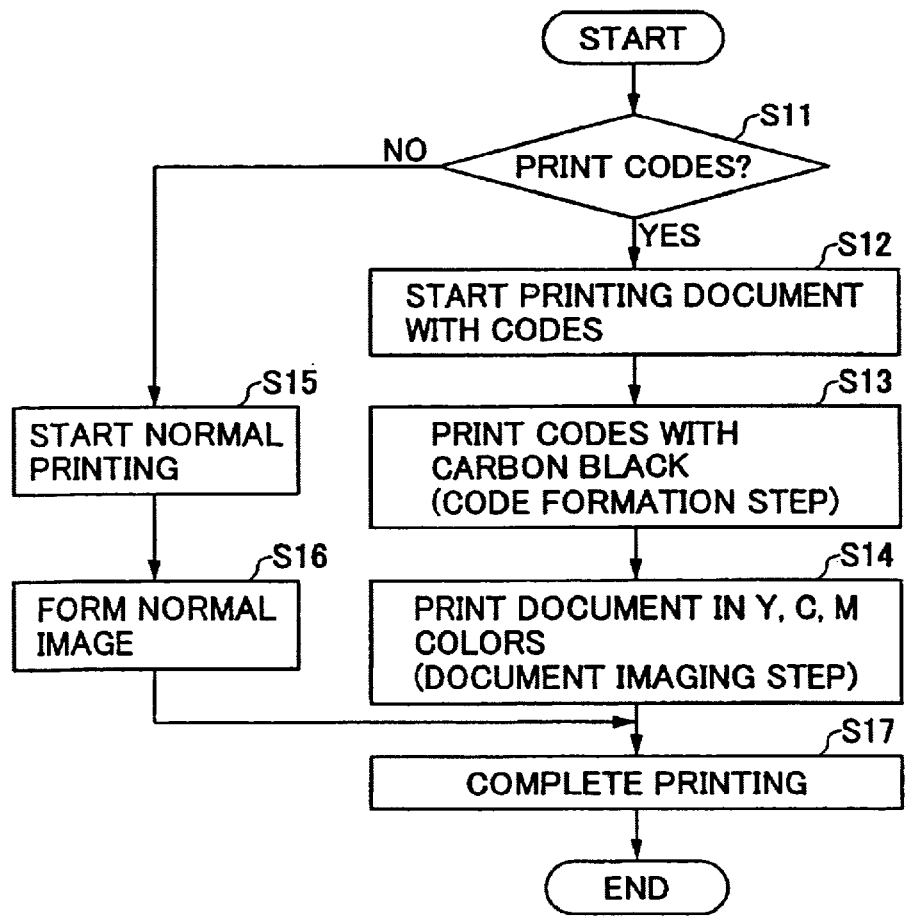
FIG. 8 is a flowchart of a control operation of the printer.

FIG. 7 is a diagram showing a configuration of the laser printer 30 using a black toner absorbing light in the near infrared spectral region and color toners of cyan, magenta, and yellow that absorb no or little light in the near infrared spectral region. FIG. 8 is a flowchart of a printing control operation.

According to this embodiment, in step S11 of FIG. 8, the user freely determines whether to perform code printing at the time of a printing operation. However, it is also possible to have code printing performed in every printing operation without having the user make selection. If the user can freely determine whether to perform code printing as in this embodiment, normal printing (steps S15 and S16), which is performed without code printing at the time of printing the final version of a document after all corrections are completed, is also performable, thus considerably increasing convenience of printing.

Here, a term "correction" includes an addition of information.

If the user determines in step S11 that code printing is to be performed (that is, YES in step S11), in step S12, printing of a document with codes (code symbols) is started on condition that the codes are assigned in advance. If the codes are not assigned, a request for the codes is made to the server or PC so that the codes are assigned. At this point, the printing data of the codes is transmitted to a communication port 29 of the printer 30 so that the printing is started. In the printer 30 of FIG. 7, paper sheets (transfer papers) are conveyed from a paper feeding tray 31 so that the printing is performed on the paper sheets by a normal electrophotography process.

According to the configuration of the printer 30 of FIG. 7, a black color developing device 33a, color developing devices 33b through 33d for cyan, magenta, and yellow, respectively, and a transfer drum 34 are provided around a light-sensitive body 32 in a rotational direction thereof. An electrostatic latent image is formed on the light-sensitive body 32. The color developing devices 33b through 33d may be provided in any order. Further, a control part 37 is provided to control the power supply parts of chargers such as an electrification charger 35 and a transfer charger 36 and motors that drive the rotating bodies including the light-sensitive body 32. Furthermore, the electrification charger 35 that uniformly charges the light-sensitive layer of the light-sensitive body 32, the transfer charger that transfers a toner image on the light-sensitive body 32 onto a transfer paper that is a paper medium, a separation charger (not shown in the drawing) that separates the transfer paper finished with the image transfer from the surface of the transfer drum 34, a cleaning device 38 that removes a residual toner on the surface of the light-sensitive body 32, a discharger (not shown in the drawing) that removes the electric charge on the surface of the light-sensitive body 32, and a conveying part that conveys the transfer paper are provided around the light-sensitive body 32. A fixing device 39 is provided to fix the toner image on the transfer paper finished with the image transfer by heat and pressure.

Normally, an exposure position on the precharged light-sensitive body 32 is exposed to light first so that the electrostatic latent image is formed on the light-sensitive body 32. If the contents of the electrostatic latent image is black, normally, toner development is performed by the black color development device 33a, and the transfer paper reaches the light-sensitive body 32 at the same time that the leading part of the visible image reaches the transfer drum 34 so that the visible image (the black toner image) is transferred onto the transfer paper. Thereafter, the transfer paper is separated from the transfer drum 34 to be conveyed to the fixing device 39.

Here, a description will first be given of a code formation process (step) using a black toner. Usually, the black toner is formed of carbon black. Therefore, the black toner is highly absorptive with respect to light in the near infrared spectral region. Any material that absorbs light in the near infrared spectral region may be used for the black toner. In this embodiment, if the user determines in step S11 that code printing is to be performed (that is, YES in step S11), in step S13, the codes are printed by way of the code formation process (step) by a black imaging process using the black toner. The operation of step S13 is performed as the code formation process (step) or the function of a code formation part. Since the black toner is used in a common electrophotography process, the desired object of the present invention is achievable without making a great change in the current laser color printer. It goes without saying that the invisible materials described in the above-described embodiments are more preferable as the material of the codes.

Next, in step S14, a document image is formed by using the three colors of cyan, magenta, and yellow. The operation of step S14 is performed as an imaging process (step) or the function of an imaging part. That is, in forming the document image, the image is separated into the three colors, and a process of latent image formation, development, and transfer is performed with respect to each color. After this process is repeated three times, the image is conveyed to the fixing device 39. Specifically, first, a latent image is formed on the light-sensitive body 32 with respect to a first color (for instance, cyan). The latent image is developed by the color developing device 33b as a cyan image, and the cyan image is transferred onto the transfer paper that is delivered in exact timing with the cyan image. Thereafter, the transfer paper finished with the transfer of the first color is wrapped around the transfer drum 34 in preparation for the transfer of a second color. After the transfer of the first color is completed, a latent image for the second color (for instance, magenta) is formed on the light-sensitive body 32, and a magenta image is developed by the color developing device 33c. The transfer drum 34 is rotated so that the magenta image reaches a transfer position at the right timing, and the magenta image is transferred onto the transfer paper over the cyan image. When the transfer of the second color is completed, a latent image for a third color (for instance, yellow) is formed on the light-sensitive body 32, and a yellow image is developed by the color developing device 33d. The transfer drum 34 is rotated so that the yellow image reaches the transfer position at the right timing, and the positioned yellow image is superposed on the composite image of the above-described two images. Thereby, a black and color image is formed. After the transfer of the third color is completed, the transfer paper is separated from the transfer drum 34 to be delivered to the fixing device 39.

Thus, the document is printed on the transfer paper, that is, the paper medium 25 with the codes. The code information of the paper medium 25 is detected by the pen-type information input device 21 with a visible light shielding filter, and the document (image information) is recognized by the eyes of the user so that the user can correct any desired part of the document, and at the same time, the pen-type information input device 21 can detect the absolute coordinate information and the document identification information of the corrected part.

Figure 9:
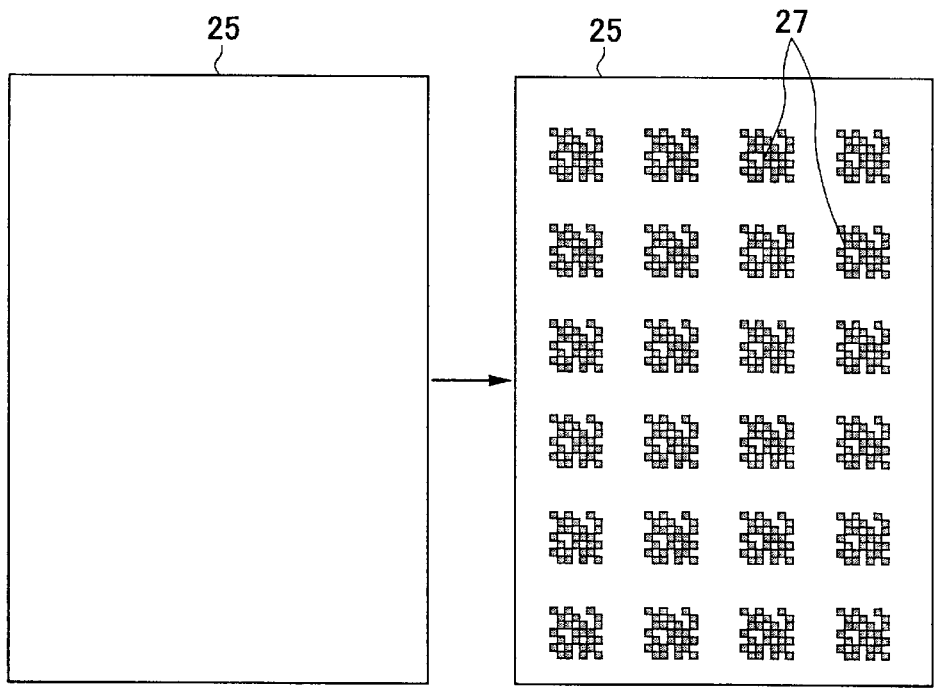
FIG. 9 is a diagram showing an example of code printing.
Figure 10:
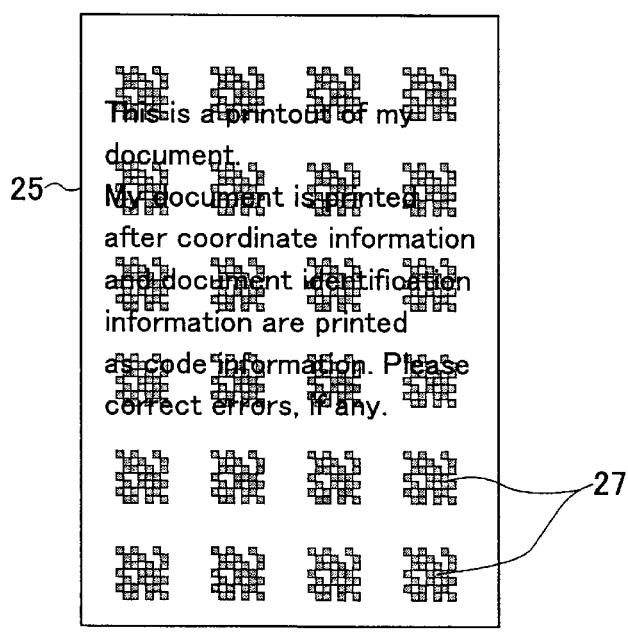
FIG. 10 is a diagram showing an example of image information printing.
Figure 11:
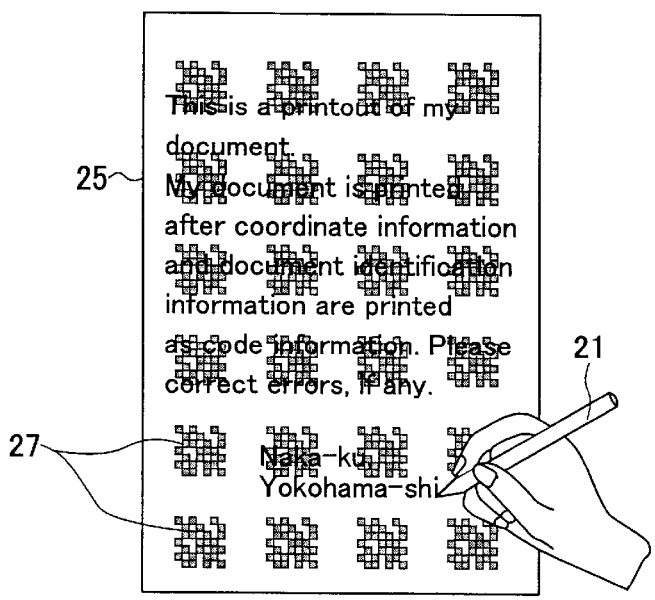
FIG. 11 is a diagram showing the way correction is performed.
Figure 12:
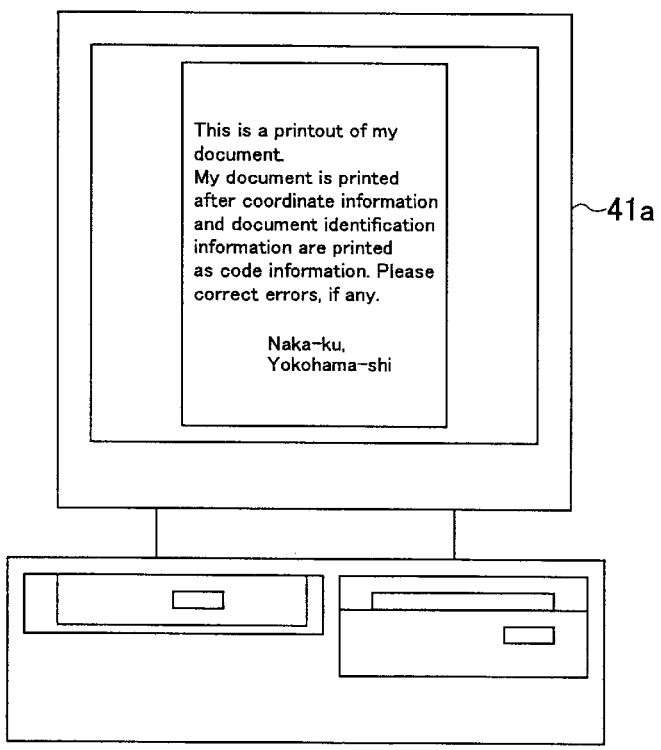
FIG. 12 is a diagram showing an output to a PC.

The above-described operation is illustrated in FIGS. 9 through 12. FIG. 9 is a diagram showing the plain paper medium 25 on which the code symbols 27 are printed with the black toner by the printer 30. FIG. 10 is a diagram showing the paper medium 25 where the document (image) information is printed on the code symbols 27 with a combination of the color toners of cyan, magenta, and yellow. The paper medium 25 of FIG. 10 is a printout ejected from the printer 30. FIG. 11 is a diagram showing the way the document is corrected with the pen-type information input device 21. FIG. 12 is a diagram showing the corrected original (electronic or digitized) document. The correction made on the paper document 25 is uploaded to a PC 41a so as to be reflected on the original document.

Figure 13:
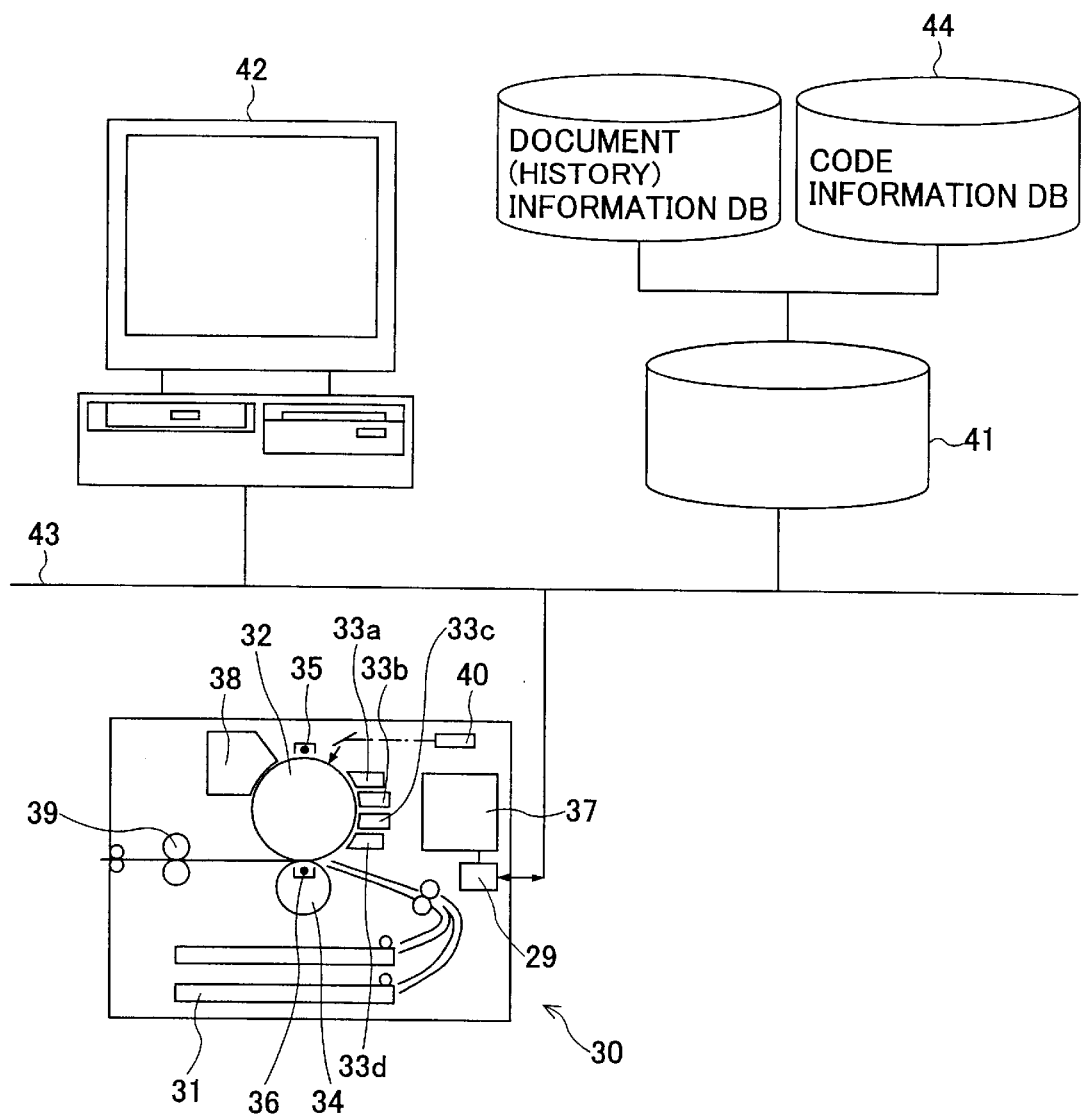
FIG. 13 is a diagram showing a system configuration of a fifth embodiment of the present invention.
Figure 14:
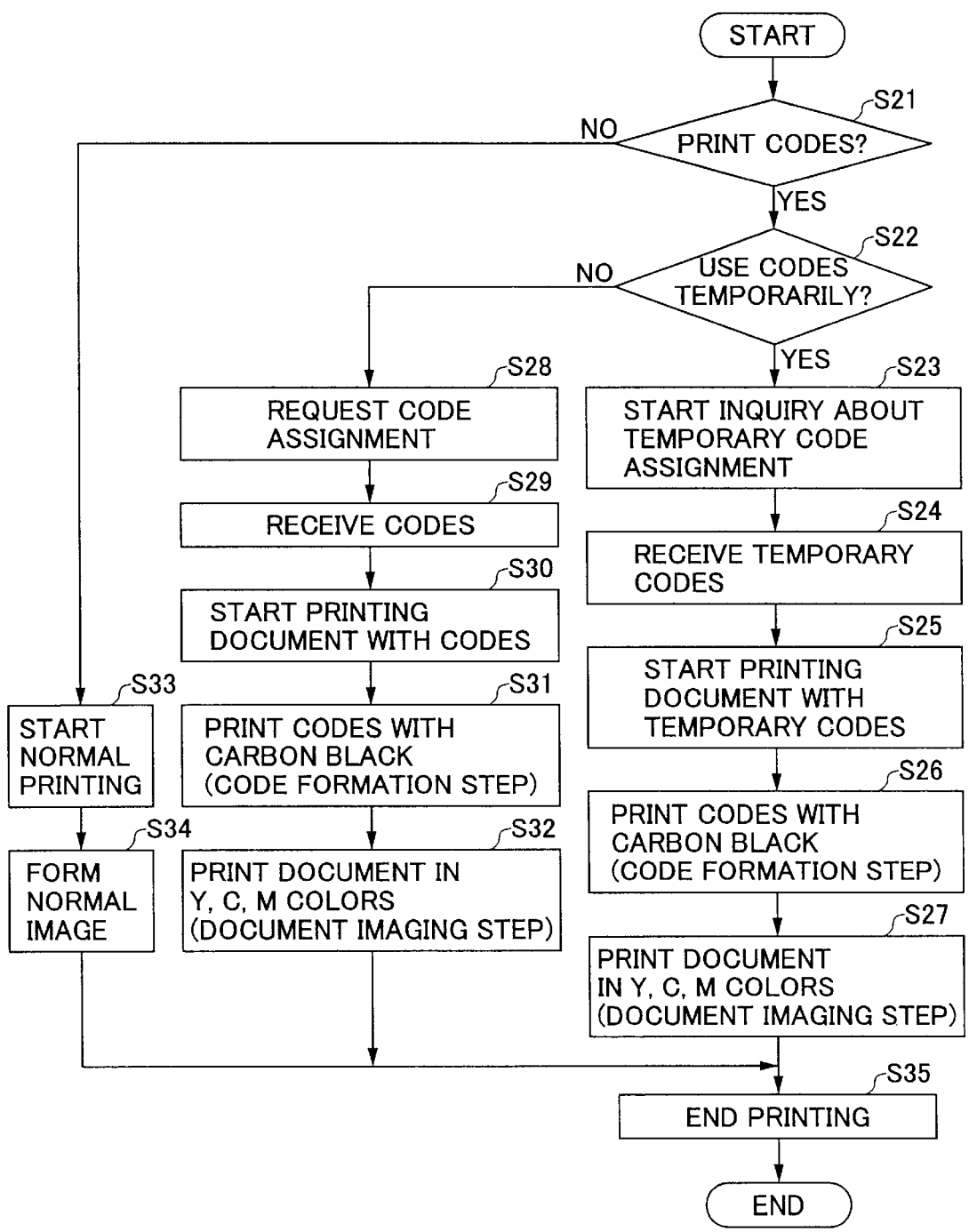
FIG. 14 is a flowchart of operation control in a client PC of a system according to the fifth embodiment.
Figure 15:
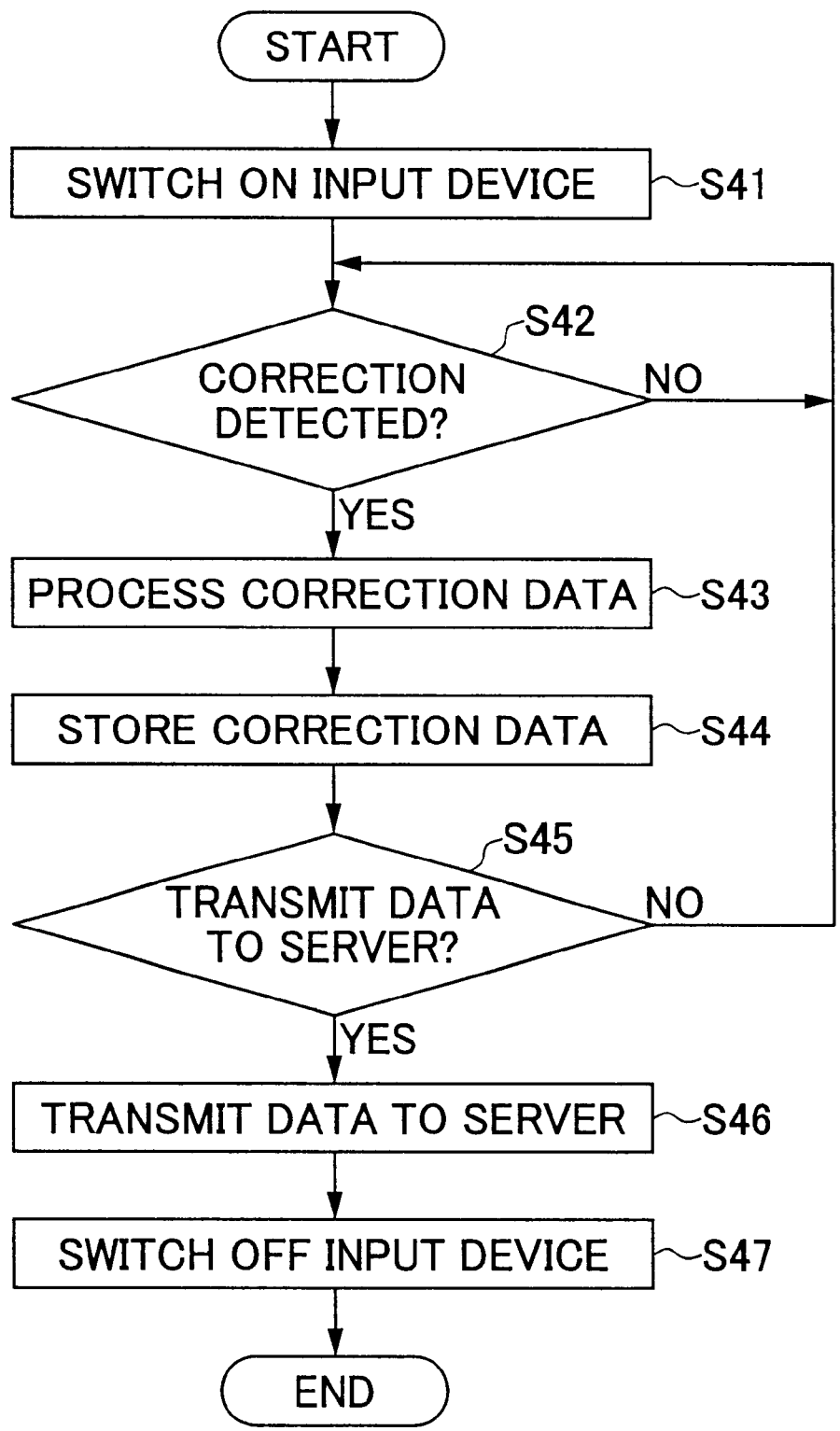
FIG. 15 is a flowchart of operation control in the pen-type information input device of the system.

A description will be given, with reference to FIGS. 13 through 17, of the fifth embodiment of the present invention. As shown in FIG. 13, this embodiment shows an application of the present invention to an image information management system where the pen-type information input device 21 and the printer 30 described in the fourth embodiment are used and the printer 30 is connected to a server 41 as an information processing apparatus or a client PC 42 by a network 43.

In this embodiment, non-characteristic coordinate values, that is, temporary values, are used as the coordinate information in codes printed by using the printer 30. That is, this is the case where the user edits a document that the user creates mainly on her/his own with the pen-type information input device 21, and once used and uploaded, the same coordinate values are no more required to be used. Therefore, the non-characteristic coordinate values are reusable as codes. Further, a used printout (a printed document) is to be discarded.

FIGS. 14 through 17 are flowcharts of operation control of the system. The above-described printer 30 is used under a network system environment. In this system, the server 41 manages and processes document (history) information and code management information. However, the client PC 42 may manage and process the information.

Here, in printing the document, the user provides an instruction to print the document on the client PC 42. First, in step S21 of FIG. 14, the user determines whether to perform code printing. That is, an instruction as to whether to perform code printing is waited for on the printer operation dialog of the client PC 42. If the system is to be used with codes being printed (that is, YES in step S21), in step S22, the user determines whether the codes are to be used temporarily. If the user determines in step S22 that the codes are for temporary use (that is, YES in step S22), in step S23, the server 41 is inquired of whether the codes can be assigned temporarily. More specifically, information such as document information to be printed, a document size, a capacity, the number of pages of the document, and a printing density is transmitted to the server 41 so as to determine whether there are temporary codes to be assigned.

Figure 16:
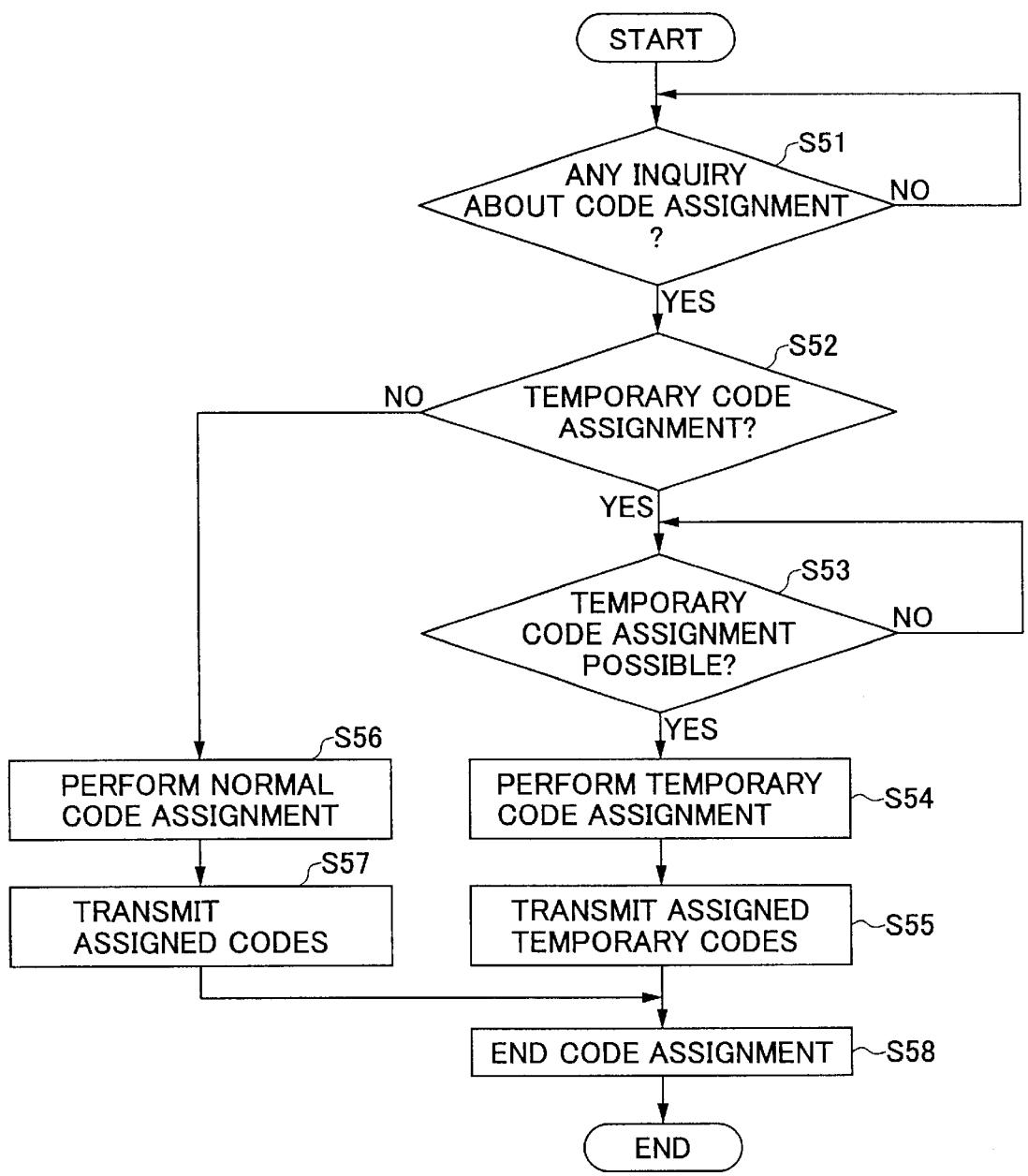
FIG. 16 is a flowchart of operation control in a sever of the system.

On the other hand, in step S51 of FIG. 16, the server 41 performs monitoring to see whether an inquiry about code assignment is made. If there is an inquiry about code assignment (that is, YES in step S51), in step S52, the server 41 determines whether the inquiry is about temporary code assignment. If it is determined in step S52 that the inquiry is about temporary code assignment (that is, YES in step S52), in step S53, the server 41 checks whether there are assignable codes on a database (DB) 44 that the server 41 manages. If there are assignable codes, in step S54, the server 41 starts temporary code assignment. The server 41 determines the presence or absence of the assignable codes by checking whether the codes are not used by another user within the range of its management and whether there are temporary codes that can be assigned based on the document information, document size, capacity, number of pages of the document, and printing density requested by the client PC 42. If there are no assignable codes (that is, NO in step S53), the server 41 gives information to that effect to the client PC 42. If there are assignable codes, in step S55, the server 41 transmits assigned temporary codes to the client PC 42. If the user does not request the temporary use of the codes on the client PC 42 (that is, NO in step S22), in step S28, the user requests normal code assignment (assignment of normal characteristic codes) so that in steps S56 and S57, the server 41 performs normal code assignment and transmits the assigned codes to the client PC 42. After step S55 or S57, in step S58, the server 41 ends the code assignment. When the server 41 transmits the temporary codes to the client PC 42 in step S55, in step S24, the client PC 42 receives the transmitted temporary codes so that in step S25, printing of the document with the temporary codes is started. The following steps S26 and S27 are equal to the above-described steps S13 and S14 of FIG. 8, respectively. That is, the operation of step S26 is performed as the code formation process (step) or the function of the code formation part, and the operation of step S27 is performed as the imaging process (step) or the function of the imaging part. In the case of the normal code assignment (steps S56 and S57), in step S29, the client PC 42 receives the transmitted assigned codes so that in step S30, printing of the document with the (characteristic) codes is started. The following steps S31 and S32 are equal to the above-described steps S13 and S14 of FIG. 8, respectively. That is, the operation of step S31 is performed as the code formation process (step) or the function of the code formation part, and the operation of step S32 is performed as the imaging process (step) or the function of the imaging part.

If the user determines in step S21 that no code printing is to be performed (that is, NO in step S21), steps S33 and S34, which are equal to the above-described steps S15 and S16, respectively, are performed.

After step S27, S32, or S34, in step S35, the printing of the document is completed.

A description will be given of the case where the document printed with the codes in the above-described manner is corrected with the pen-type information input device 21. In step S41 of FIG. 15, the pen-type information input device 21 is switched on. Then, in step S42, monitoring is performed to see whether a correction operation is actually performed. The detection of a correction operation can be performed easily by using a pressure sensor, as is well-known. If a correction operation is detected in step S42 (that is, YES in step S42), the pen-type information input device 21 detects correction data (that is, corrected or added data), and at the same time, the correction data is processed in step S43 and stored in a memory in step S44. The correction data of this case at least includes the writing coordinate information (data) and the document identification information. The printed original document can be known if there is at least the writing coordinate information. That is, since the document information to be printed is transmitted to the server 41 together with the request for the temporary code information, all the server 41 has to do is correlate and manage the assigned temporary codes and the document information. Thereafter, in step S45, it is determined whether the correction data is to be transmitted to the server 41. If it is determined in step S45 that the correction data is to be transmitted to the server 41 (that is, YES in step S45), in step S46, the correction data is transmitted from the pen-type information input device 21 to the server 41. It may be determined from the fact that the correction data is transmitted to the server 41 that the user has completed the correction operation. If NO in step S45 or in step S42, step S42 and the following steps are performed. Thereafter, in step S47, the pen-type information input device 21 is switched off.

Figure 17:
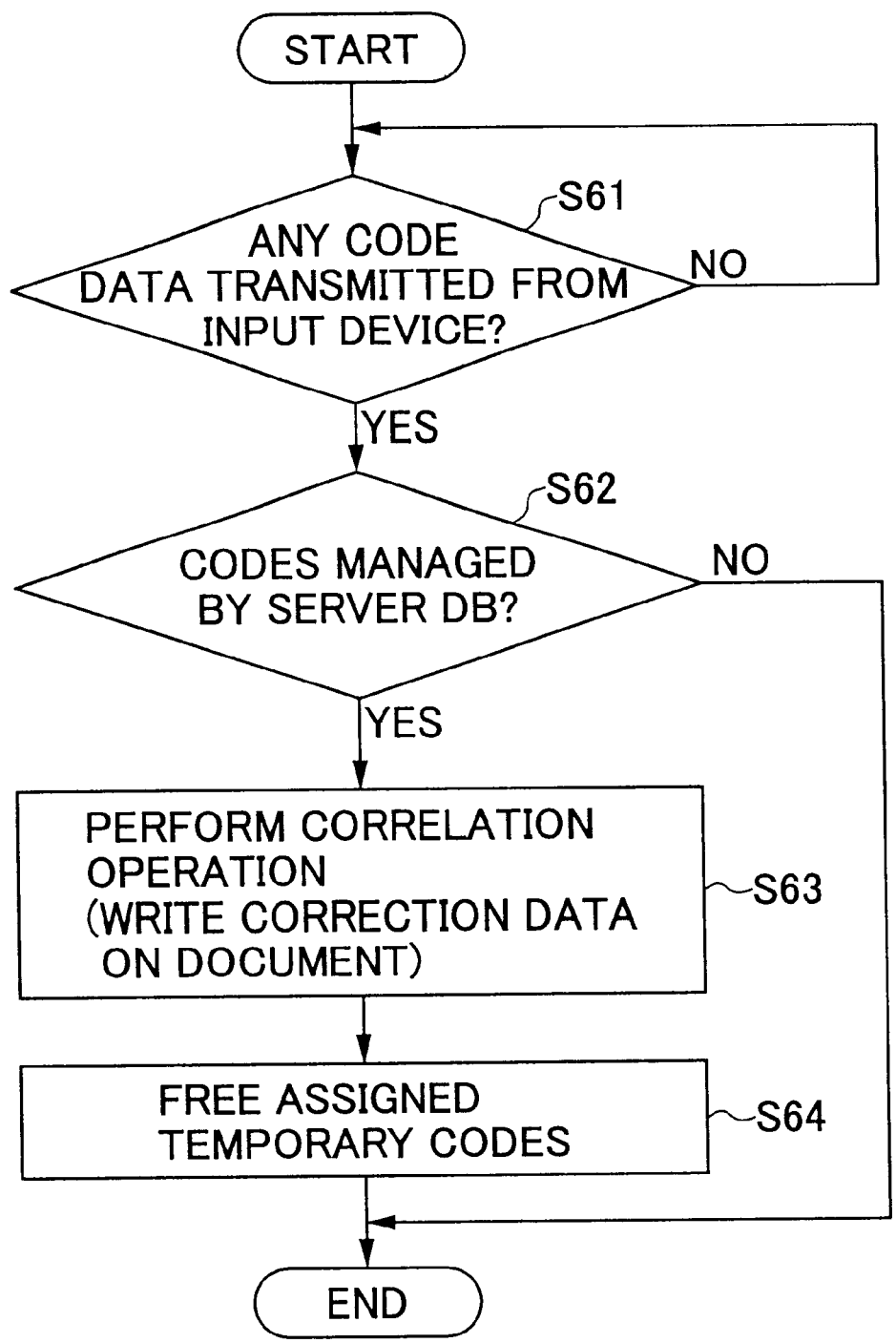
FIG. 17 is another flowchart of the operation control in the server of the system.

On the other hand, in step S61 of FIG. 17, the server 41 performs monitoring to see whether any code data is transmitted from the pen-type information input device 21. If transmitted code data is detected in step S61, in step S62, the server 41 checks whether the transmitted code data is editing data (correction data) for a document that the server 41 manages. If the code data is editing data for a document managed by the server 41, in step S63, an overwriting operation is performed to write the editing data over the document, that is, an operation of adding the trace of handwriting to an image source (the data of the document) is performed, so that the editing data and the document are correlated. Here, a term "image source" means an image source that forms the basis of image data. For instance, document data or image data can be the image source. Thereafter, in step S64, the assigned temporary codes are freed to be in a reusable state. Further, as far as the assigned temporary codes are not returned from the pen-type information input device 21, use of the assigned codes is inhibited so as to prevent the same codes from being used simultaneously by different users.

Next, referring back to FIGS. 2 and 3, a description will be given of a sixth embodiment of the present invention. In this embodiment, by using an electrophotographic printer (IPSiO Color5100D manufactured by Ricoh Co., Ltd.) employing a configuration of the printer engine 3 as shown in FIG. 3, an image including a black image was formed, in accordance with the process control shown in FIG. 2, on a paper sheet (the information display medium 1) on which the invisible QR code was printed with a diimmonium-based near infrared absorbing pigment (IRG-022 manufactured by Nippon Kayaku Co., Ltd.). According to the process of the flowchart of FIG. 2, since the paper sheet includes the invisible code (that is, YES in step S2), imaging was performed only with the color imaging materials (step S5), so that a clear image was obtained. Further, when the paper (information display medium 1) having the image formed thereon was observed by a CCD through a visible light shielding filter, only the invisible code was recognized with no visible image being seen so that the QR code was correctly decoded.

A description will be given of a seventh embodiment of the present invention.

In this embodiment, by using a piezo ink jet printer (MJ930 manufactured by Seiko Epson Corp.) provided with an ink using carbon black as a black ink, an image including a black image was formed, in accordance with the process control shown in FIG. 2, on a paper sheet (the information display medium 1) on which the invisible QR code was printed with the diimmonium-based near infrared absorbing pigment (IRG-022 manufactured by Nippon Kayaku Co., Ltd.). According to the process of the flowchart of FIG. 2, since the paper sheet includes the invisible code (that is, YES in step S2), imaging was performed only with the color imaging materials (step S5), so that a clear image was obtained. Further, when the paper (information display medium 1) having the image formed thereon was observed by a CCD through a visible light shielding filter, only the invisible code was recognized with no visible image being seen so that the QR code was correctly decoded.

A description will be given of an eighth embodiment of the present invention.

In this embodiment, a polyester resin of a weight average molecular weight Mw of 12,000, an acid value of 5, and a softening point Tm of 110° C. was employed as a resin. This polyester resin was obtained by polymerizing a terephthalic acid and an ethylene oxide-added bisphenol A.

The yellow, magenta, and cyan toners were made by mixing the polyester resin with a coloring agent as in below-described manners.

(A) Yellow Toner 95 weight percent of the above-described polyester resin and five weight percent C.I. Pigment Yellow 97 were melted and kneaded by an extruder, and thereafter were ground and classified so that a 50 weight percent toner of an average particle diameter of 7.0 $\mu$m and a 50 weight percent fine powder of an average particle diameter of 4.5 $\mu$m were obtained.

(B) Magenta Toner 95 weight percent of the above-described polyester resin and five weight percent C.I. Pigment Red 122 were melted and kneaded by an extruder, and thereafter were ground and classified so that a 50 weight percent toner of an average particle diameter of 7.0 $\mu$m and a 50 weight percent fine powder of an average particle diameter of 4.5 $\mu$m were obtained.

(C) Cyan Toner 95 weight percent of the above-described polyester resin and five weight percent C.I. Pigment Blue 15:3 were melted and kneaded by an extruder, and thereafter were ground and classified so that a 50 weight percent toner of an average particle diameter of 7.0 $\mu$m and a 50 weight percent fine powder of an average particle diameter of 4.5 $\mu$m were obtained.

(D) Black Toner

The fine powders obtained in the above-described operations (A) through (C) were employed to manufacture the black toner. The fine powders separated in the above-described operations (A) through (C), that is, the yellow fine powder, the magenta fine powder, and the cyan fine powder, were mixed, melted, and kneaded at a ratio of 35:36:29 in weight percent, and thereafter, were ground and classified so that a 50 weight percent black toner of an average particle diameter of 7.0 $\mu$m was obtained.

The above-described color toners and the black toner were combined with a ferrite carrier coated with a styrene-methacrylate copolymer to be provided in the electrophotographic printer (IPSiO Color5100D manufactured by Ricoh Co., Ltd.). When imaging was performed, with these toners, on a paper sheet (the information display medium 1) on which the invisible QR code was formed with a near infrared absorbing material, a natural image was obtained. Further, when the paper (information display medium 1) having the image formed thereon was observed by a CCD through a visible light shielding filter, only the invisible code was recognized with no visible image being seen so that the QR code was correctly decoded.

A description will be given of ink employed in the imaging apparatus of the present invention.

The near infrared absorbing pigment is employed in making a near infrared absorbing filter for absorbing near infrared rays radiated from a near infrared ray source such as a plasma display panel, a heat ray shielding filter applied on a window glass for absorbing heat rays of sunlight, and an invisible barcode, or a so-called stealth barcode. However, a common near infrared absorbing pigment is slightly soluble in an aqueous solvent so that its usage is limited. Particularly, in terms of influence on environment, it is desirable to use the aqueous solvent.

In the fields of ink jet ink, water-based ink, and water-based paint, attempts have been made to disperse a slightly soluble organic dye in the aqueous solvent. For instance, Japanese Laid-Open Patent Application Nos. 61-283875, 64-6074, 1-31881, 55-80477, 58-13675, 62-225577, and 1-213377 disclose methods therefor. Further, there is a description of dispersion of a naphthalocyanine pigment into a water-soluble paint in Japanese Laid-Open Patent Application No. 9-26371. However, according to these methods, a particle diameter-becomes large because of cohesion of pigment particles, or pigment particles of a large diameter are employed in advance to prevent cohesion thereof. Therefore, a dispersion liquid has low transparency, or causes clogging of an ink jet nozzle if the dispersion liquid is used as ink jet ink.

Further, in the field of the ink jet ink, the ink jet nozzle becomes finer as higher image quality is required so that ink of an average particle diameter of 500 nm or less is required to prevent nozzle clogging. However, in an aqueous solvent-based pigment dispersion liquid, it is difficult to prevent cohesion of pigment particles so that it is difficult to form the dispersion liquid of ultra-fine particles. Japanese Laid-Open Patent Application No. 8-188722 discloses a method for making a slightly water-soluble specific azo metal complex dye water-soluble by using cyclodextrin that is a water-soluble cyclic saccharide formed of a hexamer, heptamer, or octamer of an amylose derivative to have a molecular weight of 1000 to 1300. This method is applicable limitedly to the specific azo metal complex dye. According to this method, the inclusion function of cyclodextrin is developed only for the specific azo metal complex dye to make the specific azo metal complex dye water-soluble. However, no description is given of a water-soluble compound without inclusion function.

Japanese Laid-Open Patent Application No. 2000-26774 discloses a method of dispersing pigments in the aqueous solvent by using a polymer with each pigment having a particle diameter of less than or equal to 200 nm. However, no description is given of the near infrared absorbing pigment.

The present invention also relates to a near infrared absorbing pigment dispersion liquid including dispersed particles of an average particle diameter of 500 nm or less. This dispersion liquid is obtained by forming a complex of a near infrared absorbing pigment that is slightly soluble in an aqueous solvent and a water-soluble polymer and dispersing the complex in an aqueous solvent. If the average particle diameter is larger than 500 nm, the pigments are prone to precipitate so that the dispersion liquid has poor transparency.

In the near infrared absorbing pigment dispersion liquid of the present invention, any solvent that has compatibility with water and can dissolve a water-soluble polymer may be employed as the aqueous solvent. Examples of the aqueous solvent include water, alcoholic solvents such as methanol, ethanol, propanol, isopropanol, and butanol, ketone-based solvents such as acetone and methyl ethyl ketone, and amine-based solvents such as butylamine, cyclohexylamine, and aniline. The type and amount of an aqueous solvent to be used depend on a near infrared absorbing pigment and a water-soluble polymer to be used. The most preferable aqueous solvent is water. The amount of water to be used is one to 1000 parts by weight, preferably, five to 100 parts by weight, per one part by weight of the water-soluble polymer.

A water-soluble polymer employed in a method according to the present invention forms a complex with one percent by weight or more, preferably, ten percent by weight or more, of a near infrared absorbing pigment to be used. Further, the average molecular weight of the water-soluble polymer is normally 1000 or more, preferably, 5000 or more. If the average molecular weight is low, dispersed particles become unstable to precipitate in the aqueous solvent. Furthermore, the water-soluble polymer to be used in the method of the present invention has a solubility of 0.1 percent by weight or more to an aqueous solvent to be used.

Examples of the water-soluble polymer to be used in the near infrared absorbing pigment dispersion liquid of the present invention include nonionic surfactants such as polyvinyl pyrrolidone, polyvinyl alcohol, polyethylene glycol, polypropylene glycol, polyethylene glycol nonyl phenyl ether, higher alcohols, polyoxyalkylene glycols, EO-added alkylamines, and EO-added alkylamides, anionic surfactants such as condensation products of naphthol, formalin, and sulfite soda, condensation products of cresol, formalin, and sulfite soda, alkylether (or phenylether) sulfate salts, and alkylbenzen sulfone acids and salts thereof, polyamino acids such as a lactic acid. A copolymer including these as units may be employed as the water-soluble polymer.

Further, the water-soluble polymer may be employed solely or a mixture of two or more of the water-soluble polymers may be used. Further, it is preferable that the water-soluble polymer include a wetting agent or an antiseptic such as ethylene glycol or glycerol to prevent nozzle clogging or ink corrosion. The amount of the water-soluble polymer to be used is 1000 parts by weight or less, preferably, 0.1 to 100 parts by weight to one part by weight of the near infrared absorbing pigment to be used.

Specifically, the near infrared absorbing pigment dispersion liquid of the present invention is manufactured by dispersing in the aqueous solvent a near infrared absorbing pigment-containing water-soluble polymer which is a complex formed of the near infrared absorbing pigment that is slightly soluble in an aqueous solvent and the water-soluble polymer. In the method of manufacturing the near infrared absorbing pigment dispersion liquid according to the present invention, a method of dissolving the near infrared absorbing pigment in the water-soluble polymer differs depending on the physical properties of the near infrared absorbing pigment and the water-soluble polymer. Normally, the near infrared absorbing pigment is dissolved in the water-soluble polymer by dissolving first the water-soluble polymer and next the near infrared absorbing pigment in an organic solvent and thereafter removing the organic solvent by distillation, or by simultaneously adding and dissolving the near infrared absorbing pigment and the water-soluble polymer in an organic solvent and thereafter removing the organic solvent by distillation. If the water-soluble polymer or the near infrared absorbing pigment is liquid at room temperature, the water-soluble polymer and the near infrared absorbing pigment may be dissolved by a mixing operation such as kneading. A temperature at which the near infrared absorbing pigment is dissolved in the water-soluble polymer, which temperature depends on the stability of the near infrared absorbing pigment and the water-soluble polymer, is 300° C. or less; preferably, zero to 100° C., and more preferably, 20 to 60° C.

Further, the near infrared absorbing pigment-containing water-soluble polymer can be dispersed in the aqueous solvent easily by mechanical agitation. Thereby, a dispersion liquid including dispersed particles of an average particle diameter of 500 nm or less can be obtained irrespective of an agitation speed and an agitator shape. Further, by filtering the obtained dispersion liquid with a membrane filter having holes of a diameter of approximately 800 nm or less, the particles are dispersed more evenly in the dispersion liquid.

The organic solvent employed herein, which differs depending on a combination of the water-soluble polymer and the near infrared absorbing pigment, preferably dissolves the water-soluble polymer and the near infrared absorbing pigment. Further, it is desirable that the organic solvent be prepared to have proper characteristics and the near infrared absorbing pigment and the water-soluble polymer be prepared to have proper condensations so that the water-soluble polymer is separated first in removing the organic solvent by distillation. Thereby, the near infrared absorbing pigment can be dispersed in the aqueous solvent as ultra-fine particles without precipitation. Examples of the organic solvent include aromatic hydrocarbon solvents such as benzene, toluene, xylene, anisole, phenetole, chlorobenzene, trifluoromethylbenzene, benzene fluoride, and phenol, aliphatic hydrocarbon solvents such as hexane, cyclohexane, dichloromethane, chloroform, dichloroethane, trichloroethane, and perchloroethylene, ketone-based solvents such as acetone, methyl ethyl ketone, cyclohexanone, and methylcyclohexanone, amine-based solvents such as butylamine, cyclohexylamine, aniline, ethylenediamine, pyridine, morpholine, 2-aminoethanol, diethanolamine, triethanolamine, and aminoethylethanolamine, N,N-dimethylformamide, N,N-dimethylacetamide, dimethyl sulfoxide, sulfolane, 1,3-dimethyl-2-imidazolidinone, dimethyl carbonate, and acetonitrile. The organic solvent preferably boils at 100° C. or less at normal pressures.

The near infrared absorbing pigment employed in the near infrared absorbing pigment dispersion liquid of the present invention has low solubility to the aqueous solvent to be used, and the water-soluble polymer forms a complex with 0.1 percent by weight or more, preferably, one percent by weight or more, of the near infrared absorbing pigment. Further, the near infrared absorbing pigment absorbs little light in the visible region, and is highly absorptive with respect to light in the wavelength range of 700 to 1400 nm, which is the near infrared spectral region. Since the near infrared absorbing pigment absorbs light in the spectral region that is different from a spectral region (the visible region of 400 to 700 nm) where a pigment used for normal printing absorbs light, a solid image acquisition element can recognize an invisible code formed with the near infrared absorbing pigment separately from a normally printed image through a filter. Further, if the near infrared absorbing pigment has no color, the near infrared absorbing pigment provides no color to a near infrared ray absorbing filter for a plasma display or a hear ray shielding filter for a window glass when employed in the filter, for instance. Therefore, such filters are visually quiet so as to keep the aesthetic values of the products to which the filters are attached.

Figure 18:
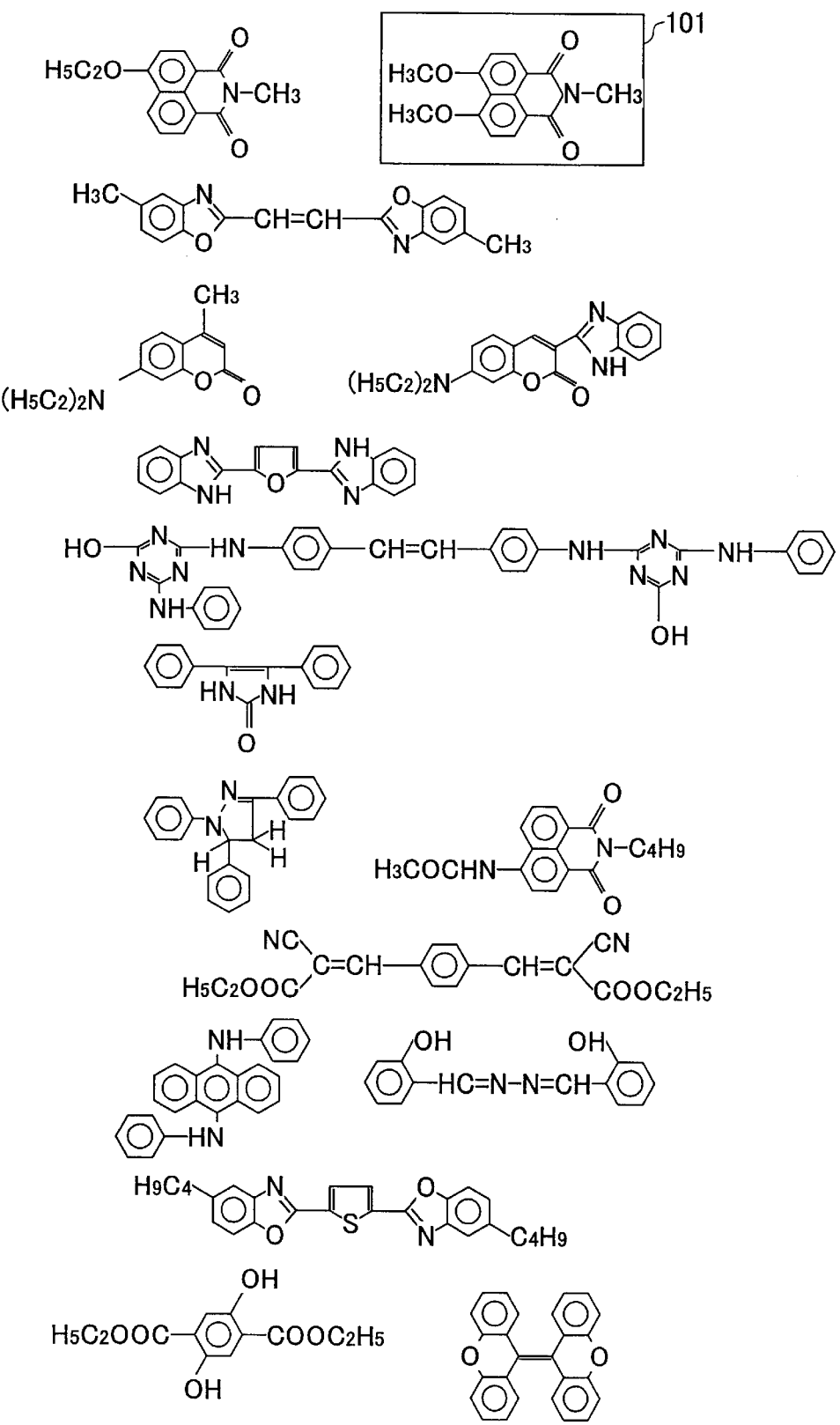
FIG. 18 is a diagram showing fluorescent pigments that emit light in a wavelength range of 400 to 500 nm.
Figure 19:
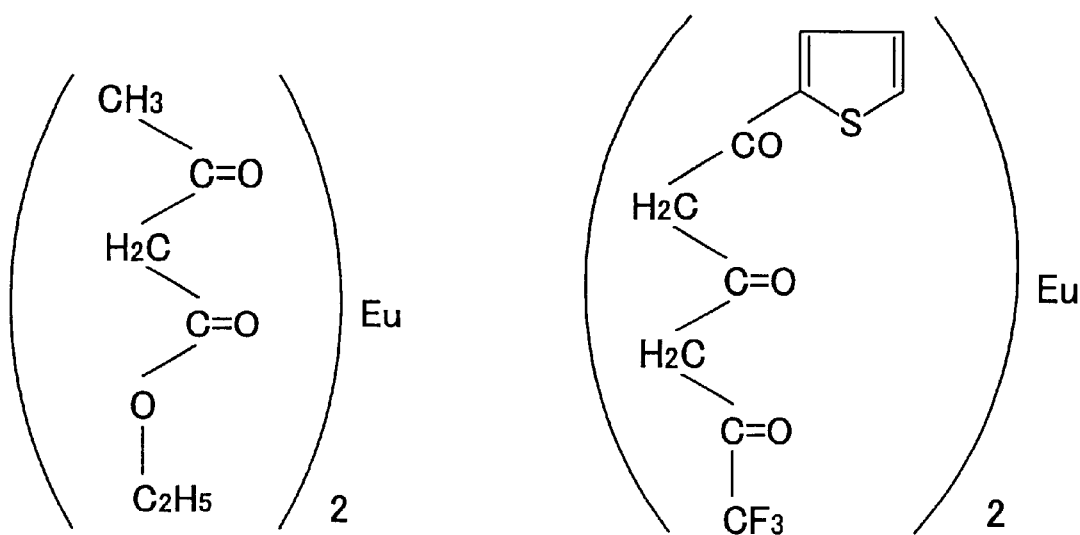
FIG. 19 is a diagram showing fluorescent pigments that emit light in a wavelength range of 600 to 700 nm.

The near infrared absorbing pigment employed in the present invention may have color. However, the near infrared absorbing pigment preferably has no or as little color as possible. Even if the near infrared absorbing pigment has color, the color is preferably a light color such as yellow or yellowish green, and colors like gray are not desirable. In the case of a near infrared absorbing pigment that absorbs light in the visible region, the near infrared absorbing pigment can be turned into a colorless near infrared absorbing composite by including a fluorescent pigment emitting light that offsets the absorption of light in the visible region. For such a purpose, a fluorescent pigment that emits light in the wavelength range(s) (in most cases, of 400 to 500 nm and/or 600 to 700 nm) in the visible region of the near infrared absorbing pigment is employed. FIGS. 18 and 19 show fluorescent pigments that emit light in the wavelength ranges of 400 to 500 nm and 600 to 700 nm, respectively. However, the fluorescent pigment is not limited to those shown in FIGS. 18 and 19, but any fluorescent pigment that satisfies the above-described condition may be used.

Further, if a fluorescent pigment that emits light in the visible region due to the excitation of ultraviolet light is mixed into a colorless near infrared absorbing pigment, the existence of the colorless near infrared absorbing pigment can be confirmed by projecting black light (whose main wavelength is 365 nm) thereto. Thereby, it can be easily confirmed whether an invisible image is correctly printed.

The near infrared absorbing pigment dispersion liquid obtained according to the method of the present invention has extremely fine particles of 500 nm or less, preferably, 100 nm or less, in diameter to be highly transparent. The dispersion liquid of the present invention is used for invisible ink jet ink, water-based ink, and water-based paint. The ink jet ink is ink for an ink jet printer that is used as an output apparatus of a personal computer or a word processor. The water-based ink is ink for recording used with a recording instrument such as a water-based pen on a material on which recording is performed, such as paper. The water-based paint is normally applied in the form of a filmy coat on materials such as paper, cloth, and building materials. In any case, the ink or paint is composed of a pigment, an aqueous solvent, and an additive. The present invention is characterized by using the near infrared absorbing pigment dispersion liquid as the pigment and aqueous solvent. Further, if the near infrared absorbing pigment is relatively unstable in the aqueous solvent, the near infrared absorbing pigment may be kept in a state of a complex of the near infrared absorbing pigment and a water-soluble polymer so that the complex may be dissolved in the aqueous solvent immediately before its use.

The near infrared absorbing pigment dispersion liquid of the present invention may be used in each of bubble and piezo methods, which are two main ink jet recording methods. According to the bubble method, ink is ejected by bubbles generated by heating the ink exponentially, and according to the piezo method, ink is ejected by using a ceramic material that deforms on application of a voltage. The ink jet ink is used by being provided inside an ink jet printer as ink. Normally, for convenience of maintenance or refilling, the ink jet ink is provided in an ink cartridge. When the near infrared absorbing pigment dispersion liquid of the present invention is employed as the ink jet ink, normally, an invisible code can be printed by using a commercially available ink jet printer without making any change therein.

The water-based ink of the present invention is normally used by being provided in an ink cartridge for convenience of its maintenance and refilling. Further, application of the water-based paint of the present invention is performed by using an instrument such as a brush, a bar coater, a trowel, or a spray.

Figure 20:
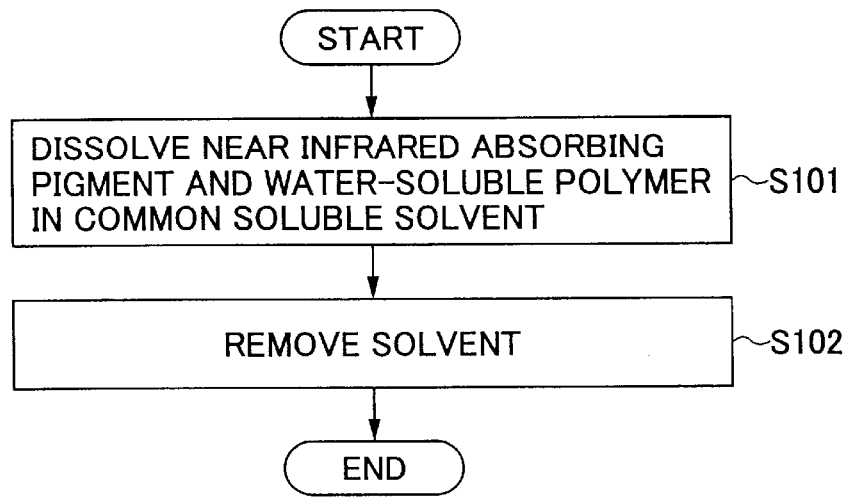
FIG. 20 is a flowchart of an operation process according to a method of manufacturing a complex of a near infrared absorbing pigment and a water-soluble polymer according to the present invention.

FIG. 20 is a flowchart of an operation process according to the method of manufacturing the complex of the near infrared absorbing pigment and the water-soluble polymer according to the present invention. In step S101, the near infrared absorbing pigment and the water-soluble polymer are added to a common soluble solvent so as to be dissolved by ultrasonic agitation. In step S102, the solvent is removed so that the complex is manufactured. It is desirable that the near infrared absorbing pigment, the water-soluble polymer, and the solvent be prepared so that the water-soluble polymer is separated first in removing the solvent. Further, the near infrared absorbing pigment is highly absorptive with respect to light in the wavelength range of 700 to 1400 nm, and the water-soluble polymer has an average molecular weight of 1000 or over.

Figure 21:
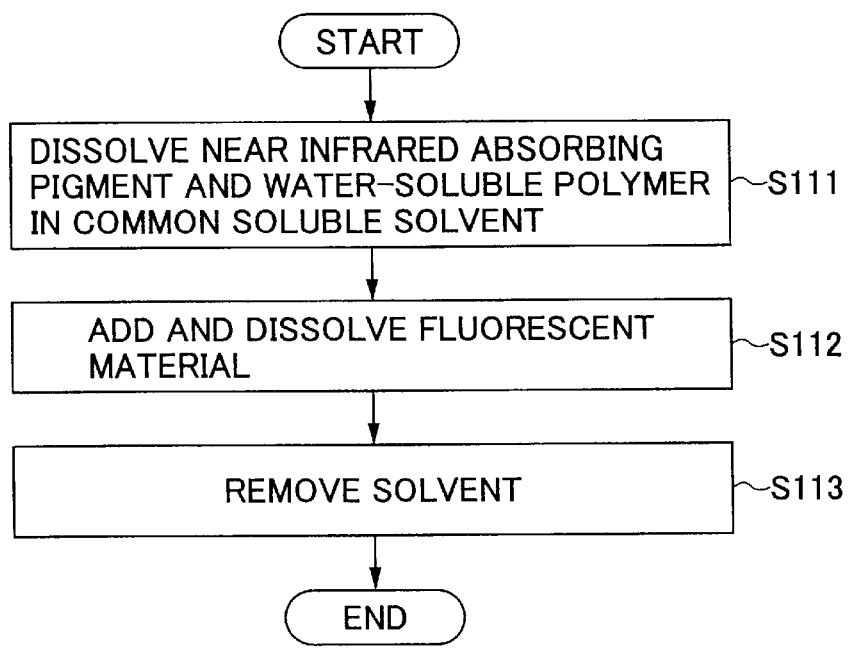
FIG. 21 is a flowchart of another operation process according to the method of manufacturing the complex of the near infrared absorbing pigment and the water-soluble polymer according to the present invention.

FIG. 21 is a flowchart of another operation process according to the method of manufacturing the complex of the near infrared absorbing pigment and the water-soluble polymer according to the present invention. In step S111, the near infrared absorbing pigment and the water-soluble polymer are added to a common soluble solvent so as to be dissolved by ultrasonic agitation. In step S112, a fluorescent material is added to be dissolved in the solvent. In step S113, the solvent is removed so that the complex is manufactured. The near infrared absorbing pigment, the water-soluble polymer, and the fluorescent material are not dissolved limitedly in the order described in FIG. 21, but may be dissolved in any order that is preferred to manufacture the complex. For instance, the near infrared absorbing pigment, the water-soluble polymer, and the fluorescent material may simultaneously be added to and dissolved in the solvent.

Figure 22:
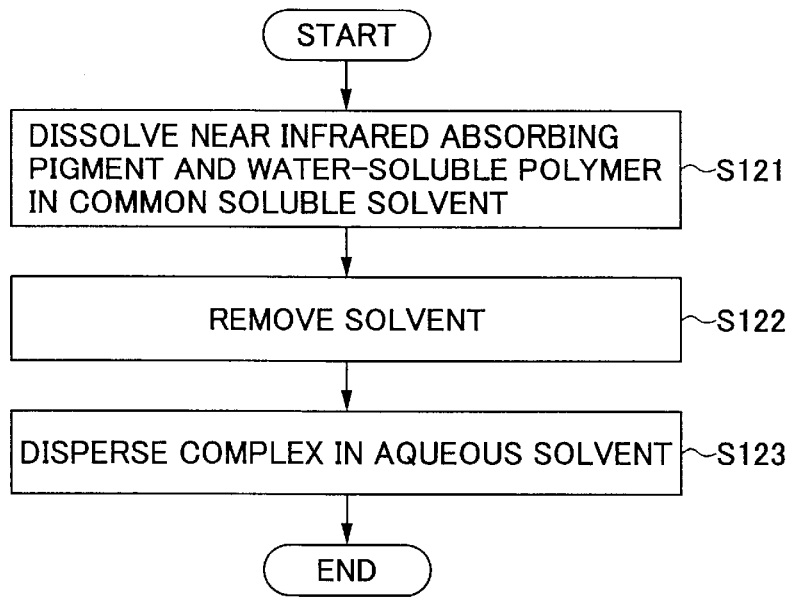
FIG. 22 is a flowchart of an operation process according to a method of manufacturing a near infrared absorbing dispersion liquid according to the present invention.

FIG. 22 is a flowchart of an operation process according to the method of manufacturing the near infrared absorbing dispersion liquid according to the present invention. In step S121, the near infrared absorbing pigment and the water-soluble polymer are added to a common soluble solvent so as to be dissolved by ultrasonic agitation. In step S122, the solvent is removed so that the complex is manufactured. In step S123, the manufactured complex is dispersed in the aqueous solvent so that the near infrared absorbing pigment dispersion liquid can be manufactured. The near infrared absorbing pigment dispersion liquid obtained through the process shown in FIG. 22 has dispersed particles of 500 nm or less in diameter. Therefore, if this dispersion liquid is employed as ink jet ink, ink stability is increased without causing clogging of an ink jet head.

Figure 23:
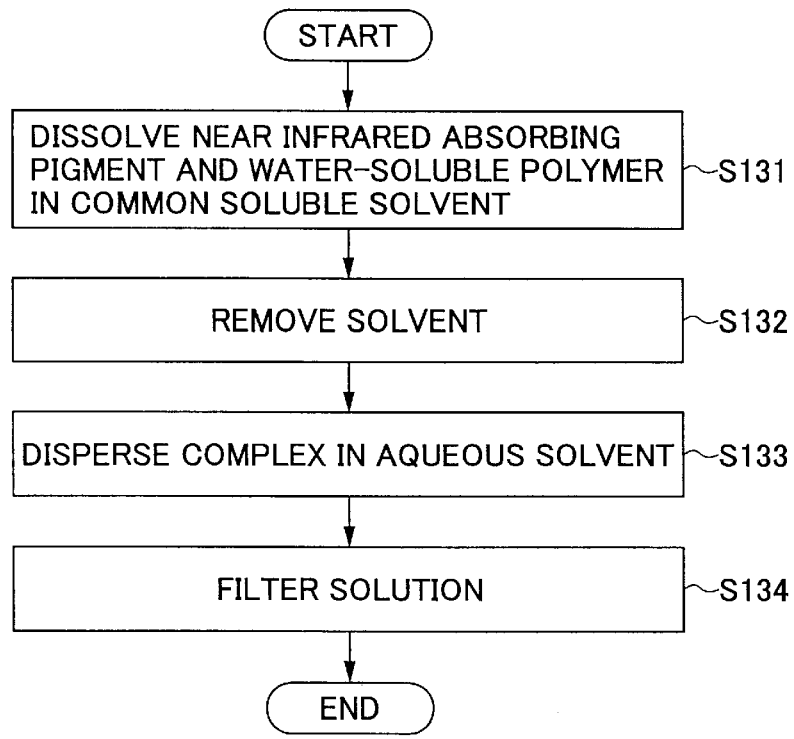
FIG. 23 is a flowchart of another operation process according to the method of manufacturing the near infrared absorbing dispersion liquid according to the present invention.

FIG. 23 is a flowchart of another operation process according to the method of manufacturing the near infrared absorbing dispersion liquid according to the present invention. In step S131, the near infrared absorbing pigment and the water-soluble polymer are added to a common soluble solvent so as to be dissolved by ultrasonic agitation. In step S132, the solvent is removed so that the complex is manufactured. In step S133, the manufactured complex is dispersed in the aqueous solvent. In step S134, the solution obtained in step S133 is filtered so that the uniform near infrared absorbing pigment dispersion liquid can be manufactured. Therefore, if this dispersion liquid is employed as ink jet ink, ink stability is increased without causing clogging of an ink jet head.

The complex of the near infrared absorbing pigment and the water-soluble polymer or the near infrared absorbing pigment dispersion liquid is not manufactured limitedly by the operation processes shown in FIGS. 20 and 21 or FIGS. 22 and 23, but may be manufactured by a combination of the operation processes shown in FIGS. 20 and 21 or FIGS. 22 and 23 as required.

Figure 24:
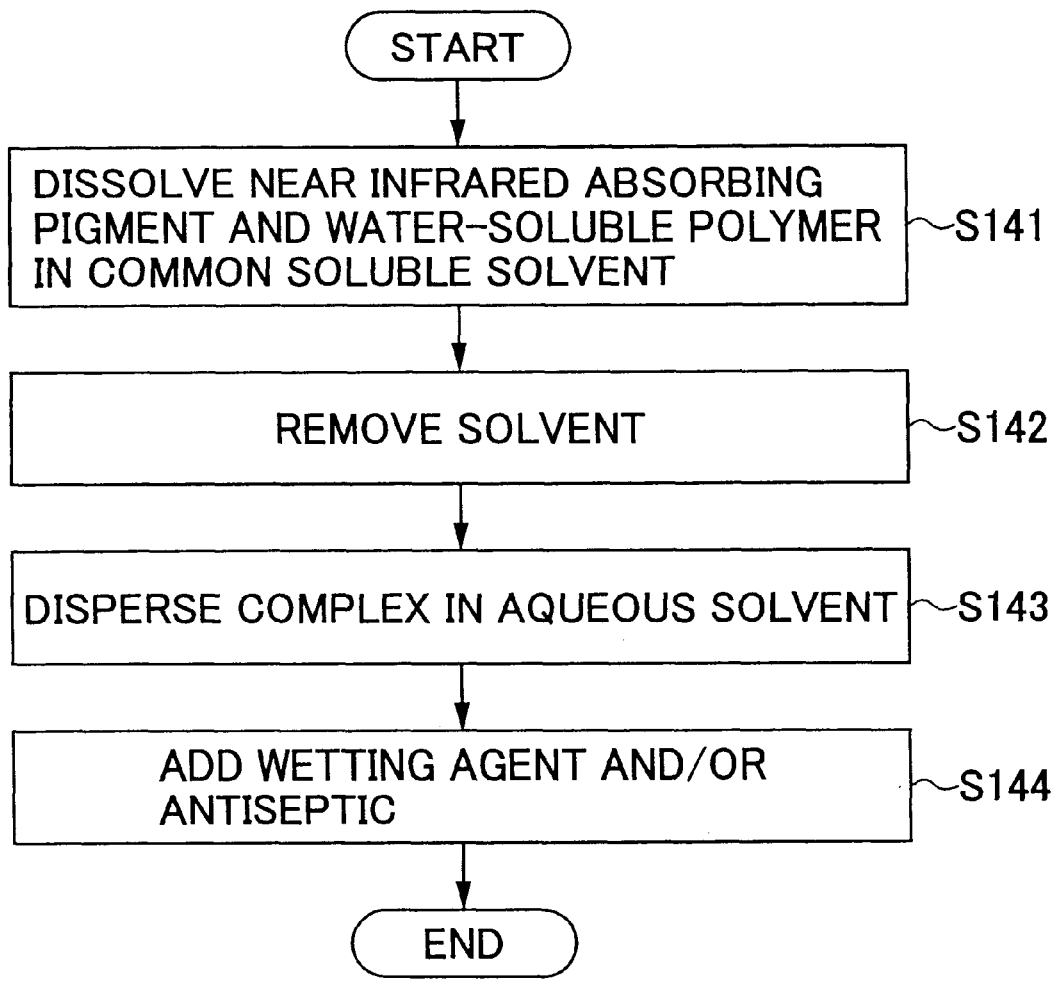
FIG. 24 is a flowchart of an operation process according to a method of manufacturing an ink jet ink by using the near infrared absorbing pigment dispersion liquid according to the present invention.

FIG. 24 is a flowchart of an operation process according to the method of manufacturing the ink jet ink by using the near infrared absorbing pigment dispersion liquid according to the present invention. In step S141, the near infrared absorbing pigment and the water-soluble polymer are added to a common soluble solvent so as to be dissolved by ultrasonic agitation. In step S142, the solvent is removed so that the complex is manufactured. In step S143, the manufactured complex is dispersed in the aqueous solvent. In step S144, a wetting agent and/or an antiseptic are/is further added to the solution obtained in step S143. Thereby, an invisible ink jet ink causing no clogging of an ink jet head or ink corrosion can be manufactured. In the operation process shown in FIG. 24, the near infrared absorbing pigment dispersion liquid manufactured by the operation process shown in FIG. 22 is employed. However, the near infrared absorbing pigment dispersion liquid manufactured by the operation process shown in FIG. 6 or by a combination of the operation processes shown in FIGS. 4 and 6. Although the wetting agent and/or the antiseptic are/is included in the near infrared absorbing pigment dispersion liquid in the operation process shown in FIG. 24, the ink jet ink may be manufactured without the wetting agent and/or the antiseptic. Further, the water-based paint and the water-based ink may be manufactured by properly adding an additive thereto in the same way.

EXAMPLE 1

200 mg of polyvinyl pyrrolidone (a water-soluble polymer; GANEX P-904 manufactured by International Specialty Products) and 20 mg of a diimmonium-based near infrared absorbing pigment (IRG-022 manufactured by Nippon Kayaku Co., Ltd.) were added to two grams of acetonitrile to be dissolved by ultrasonic agitation at room temperature. The acetonitrile was removed by distillation from this solution under depressurized conditions so that 224 mg of a uniform complex of the near infrared absorbing pigment and the water-soluble polymer was obtained. This complex was put in ten grams of distilled water and was dissolved by ultrasonic agitation at room temperature so that a uniform dispersion liquid was obtained. The measurement results showed that the average particle diameter of dispersed particles in the dispersion liquid was 500 nm.

EXAMPLE 2

A two-dimensional code was printed with the dispersion liquid prepared in Example 1 by using the piezo ink jet printer (MJ930 manufactured by Seiko Epson Corp.). The dispersion liquid was provided in the cartridge of the printer. As a result of the printing, a light yellow image was formed. When this image was observed by a CCD camera with a visible light shielding filter, the formed image was found to be vivid.

EXAMPLE 3

A two-dimensional code was printed with the dispersion liquid prepared in Example 1 by using a heating-type ink jet printer (deskjet 850c manufactured by Hewlett-Packard Co.). The dispersion liquid was provided in the cartridge of the printer. As a result of the printing, a light yellow image was formed. When this image was observed by a CCD camera with a visible light shielding filter, the formed image was found to be vivid.

EXAMPLE 4

An invisible line drawing was made on a plain paper sheet without bleeding with the dispersion liquid prepared in Example 1. The dispersion liquid was provided in an ink cartridge for a water-based pen.

EXAMPLE 5

The dispersion liquid prepared in Example 1 was applied on a glass plate by a bar coater. Then, the dispersion liquid was dried into a transparent near infrared absorbing coating film.

EXAMPLE 6

200 mg of polyvinyl pyrrolidone (a water-soluble polymer; GANEX P-904 manufactured by International Specialty Products) and 20 mg of a diimmonium-based near infrared absorbing pigment (IRG-040 manufactured by Nippon Kayaku Co., Ltd.) were added to two grams of acetonitrile to be dissolved by ultrasonic agitation at room temperature. The acetonitrile was removed by distillation from this solution under depressurized conditions so that 223 mg of a uniform complex of the near infrared absorbing pigment and the water-soluble polymer was obtained. This complex was put in ten grams of distilled water and was dissolved by ultrasonic agitation at room temperature so that a uniform dispersion liquid was obtained. The measurement results showed that the average particle diameter of dispersed particles in the dispersion liquid was 300 nm.

EXAMPLE 7

200 mg of polyvinyl pyrrolidone (a water-soluble polymer; GANEX P-904 manufactured by International Specialty Products) and 20 mg of a diimmonium-based near infrared absorbing pigment (IRG-023 manufactured by Nippon Kayaku Co., Ltd.) were added to two grams of acetonitrile to be dissolved by ultrasonic agitation at room temperature. The acetonitrile was removed by distillation from this solution under depressurized conditions so that 223 mg of a uniform complex of the near infrared absorbing pigment and the water-soluble polymer was obtained. This complex was put in ten grams of distilled water and was dissolved by ultrasonic agitation at room temperature so that a uniform dispersion liquid was obtained. The measurement results showed that the average particle diameter of dispersed particles in the dispersion liquid was 300 nm.

EXAMPLE 8

200 mg of polyvinyl pyrrolidone (a water-soluble polymer; GANEX P-904 manufactured by International Specialty Products) and 20 mg of a phthalocyanine-based near infrared absorbing pigment (SIR-130 manufactured by Mitsui Chemicals, Inc.) were added to five grams of chloroform to be dissolved by ultrasonic agitation at room temperature. The chloroform was removed by distillation from this solution under depressurized conditions so that 227 mg of a uniform complex of the near infrared absorbing pigment and the water-soluble polymer was obtained. This complex was put in ten grams of distilled water and was dissolved by ultrasonic agitation at room temperature so that a uniform dispersion liquid was obtained. The measurement results showed that the average particle diameter of dispersed particles in the dispersion liquid was 500 nm.

EXAMPLE 9

200 mg of polyvinyl pyrrolidone (a water-soluble polymer; GANEX P-904 manufactured by International Specialty Products) and 20 mg of a phthalocyanine-based near infrared absorbing pigment (MIR-362 manufactured by Mitsui Chemicals, Inc.) were added to five grams of chloroform to be dissolved by ultrasonic agitation at room temperature. The chloroform was removed by distillation from this solution under depressurized conditions so that 225 mg of a uniform complex of the near infrared absorbing pigment and the water-soluble polymer was obtained. This complex was put in ten grams of distilled water and was dissolved by ultrasonic agitation at room temperature so that a uniform dispersion liquid was obtained. The measurement results showed that the average particle diameter of dispersed particles in the dispersion liquid was 60 nm.

EXAMPLE FOR COMPARISON 1

200 mg of polyvinyl pyrrolidone (a water-soluble polymer; GANEX P-904 manufactured by International Specialty Products) and 20 mg of a phthalocyanine-based near infrared absorbing pigment (MIR-362 manufactured by Mitsui Chemicals, Inc.) were added to five grams of acetone to be dissolved by ultrasonic agitation at room temperature. The acetone was removed by distillation from this solution under depressurized conditions so that 225 mg of a uniform complex of the near infrared absorbing pigment and the water-soluble polymer was obtained. This complex was put in ten grams of distilled water and was dissolved by ultrasonic agitation at room temperature so that a uniform dispersion liquid was obtained. However, a precipitate appeared in the dispersion liquid immediately thereafter. This is because MIR-362 was separated earlier than the water-soluble polymer due to its low solubility to acetone so that dispersed particles in the dispersion liquid had a large particle diameter.

EXAMPLE 10

The dispersion liquid prepared in Example 1 was filtered with a membrane filter of 0.8 $\mu$M so as to have finer dispersed particles of an average particle diameter of 350 nm, thus increasing its stability.

EXAMPLE 11

200 mg of polyvinyl pyrrolidone (a water-soluble polymer; GANEX P-904 manufactured by International Specialty Products), 20 mg of a diimmonium-based near infrared absorbing pigment (IRG-022 manufactured by Nippon Kayaku Co., Ltd.), and further, two milligrams of a fluorescent pigment (a molecule 101 in a square in FIG. 18) were added to two grams of acetonitrile to be dissolved by ultrasonic agitation at room temperature. The acetonitrile was removed by distillation from this solution under depressurized conditions so that 228 mg of a uniform complex of the near infrared absorbing pigment, the water-soluble polymer, and the fluorescent pigment was obtained. This complex was put in ten grams of distilled water and was dissolved by ultrasonic agitation at room temperature so that a uniform dispersion liquid was obtained. The measurement results showed that the average particle diameter of dispersed particles in the dispersion liquid was 500 nm.

EXAMPLE 12

A two-dimensional code was printed with the dispersion liquid prepared in Example 11 by using the piezo ink jet printer (MJ930 manufactured by Seiko Epson Corp.). The dispersion liquid was provided in the cartridge of the printer. As a result of the printing, an invisible image was formed. When this image was observed by a CCD camera with a visible light shielding filter, the formed image was found to be vivid.

According to the present invention, a complex of a near infrared absorbing pigment and a water-soluble polymer is obtained by removing a common soluble solvent from a solution in which the near infrared absorbing pigment and the water-soluble polymer are dissolved. Thereby, the near infrared absorbing pigment that is normally insoluble in an aqueous solvent can be dispersed in the aqueous solvent as fine particles, and a complex that is appropriate for a material of an eco-friendly ink or paint can be obtained.

The present invention is not limited to the specifically disclosed embodiments, but variations and modifications may be made without departing from the scope of the present invention.

The present application is based on Japanese priority applications No. 2000-376922 filed on Dec. 12, 2000 and No. 2001-180370 filed on Jun. 14, 2001, the entire contents of which are hereby incorporated by reference.

What is claimed is:

1. An imaging method comprising the steps of:
    (a) determining whether an object on which an image is to be formed is an information display medium on which a code is formed with an imaging material formed of a near infrared absorbing pigment; and
    (b) forming the image on the object by a printer engine with an imaging material formed of a pigment absorbing no or little light in a near infrared spectral region if said step (a) determines that the object is the information display medium.

2. The imaging method as claimed in claim 1, wherein said step (a) is performed based on a result of recognition by a code recognition device that recognizes the information display medium.

3. The imaging method as claimed in claim 1, wherein said step (a) is performed based on a setting that the object is the information display medium.

4. The imaging method as claimed in claim 1, wherein said step (b) employs only a combination of color imaging materials of three colors of cyan, magenta, and yellow in forming a black image on the information display medium.

5. The imaging method as claimed in claim 1, wherein said step (b) employs a black imaging material in forming a black image on the information display medium, the black imaging material being formed of pigments of three colors of cyan, magenta, and yellow.

6. The imaging method as claimed in claim 1, wherein the printer engine employed in said step (b) is of an electrophotographic type.

7. The imaging method as claimed in claim 1, wherein the printer engine employed in said step (b) is of an ink jet type.

8. The imaging method as claimed in claim 1, wherein the code is invisible.

9. An imaging apparatus comprising:
    a printer engine;
    a determination part that determines whether an object on which an image is to be formed is an information display medium on which a code is formed with an imaging material formed of a near infrared absorbing pigment; and
    an imaging part that forms the image on the object by said printer engine with an imaging material formed of a pigment absorbing no or little light in a near infrared spectral region if said determination part determines that the object is the information display medium.

10. The imaging apparatus as claimed in claim 9, wherein said determination part determines whether the object is the information display medium based on a result of recognition by a code recognition device that recognizes the information display medium.

11. The imaging apparatus as claimed in claim 9, wherein said determination part determines whether the object is the information display medium based on a setting that the object is the information display medium.

12. The imaging apparatus as claimed in claim 9, wherein said imaging part employs only a combination of color imaging materials of three colors of cyan, magenta, and yellow in forming a black image on the information display medium.

13. The imaging apparatus as claimed in claim 9, wherein said imaging part employs a black imaging material in forming a black image on the information display medium, the black imaging material being formed of pigments of three colors of cyan, magenta, and yellow.

14. The imaging apparatus as claimed in claim 9, wherein said printer engine is of an electrophotographic type.

15. The imaging apparatus as claimed in claim 9, wherein said printer engine is of an ink jet type.

16. The imaging apparatus as claimed in claim 9, wherein the code is invisible.

17. An imaging method comprising the steps of:
    (a) forming a code on a paper medium with an imaging material formed of a near infrared absorbing pigment; and
    (b) forming an image on the paper medium with an imaging material using a pigment absorbing no or little light in a near infrared spectral region.

18. The imaging method as claimed in claim 17, wherein said step (b) employs only a combination of color imaging materials of three colors of cyan, magenta, and yellow in forming a black image on the paper medium.

19. The imaging method as claimed in claim 17, wherein said step (a) forms the code on the paper medium with a carbon black toner material by a printer engine.

20. The imaging method as claimed in claim 17, wherein:
    the code formed by said step (a) includes at least one of coordinate information that represents coordinates on the paper medium and identification information that identifies the paper medium; and
    it is freely determinable whether to perform said step (a).

21. An imaging apparatus comprising:
    a code formation part that forms a code on a paper medium with an imaging material formed of a near infrared absorbing pigment; and
    an imaging part that forms an image on the paper medium with an imaging material using a pigment absorbing no or little light in a near infrared spectral region.

22. The imaging apparatus as claimed in claim 21, wherein said imaging part employs only a combination of color imaging materials of three colors of cyan, magenta, and yellow in forming a black image on the paper medium.

23. The imaging apparatus as claimed in claim 21, wherein said code formation part forms the code on the paper medium with a carbon black toner material by a printer engine.

24. The imaging apparatus as claimed in claim 21, wherein:
    the code formed by said code formation part includes at least one of coordinate information that represents coordinates on the paper medium and identification information that identifies the paper medium; and
    it is freely determinable whether to form the code.

25. An image information management system comprising:

an imaging apparatus; and an information input apparatus, wherein:

said imaging apparatus comprises:

a code formation part that forms a code symbol on a paper medium with an imaging material formed of a near infrared absorbing pigment; and an imaging part that forms an image on the paper medium with an imaging material using a pigment absorbing no or little light in a near infrared spectral region; and said information input apparatus comprises:

an image reading device that optically reads the code symbol formed on the paper medium;

a decoding part that decodes the read code symbol;

a distortion calculation part that calculates at least one of a position, orientation, and distortion of the code symbol in an image read by said image reading device; and a coordinate detection part that detects a position of a certain point on the paper medium.

26. The image information management system as claimed in claim 25, wherein said coordinate detection part of said information input device detects the position of the certain point on the paper medium based on at least one of coordinate information representing coordinates on the paper medium and identification information that identifies the paper medium and on at least the one of the position, the orientation, and the distortion of the code symbol, the coordinate and identification information being included in information of the decoded code symbol.

27. The image information management system as claimed in claim 26, wherein the code symbol formed by said code formation part of said imaging apparatus is temporary non-characteristic coordinate information, the code symbol being managed by an information processing apparatus while said information input apparatus obtains a trace of handwriting and freed after an operation of adding the trace of the handwriting to an image source is completed.

28. The image information management system as claimed in claim 27, wherein said decoding part and said distortion calculation part of said information input apparatus and the information processing apparatus comprise a general-purpose computer.

\* \* \* \* \*